United States Patent
Cundiff et al.

(10) Patent No.: US 6,872,340 B2
(45) Date of Patent: Mar. 29, 2005

(54) RESIN TRANSFER MOLDING PROCESS

(75) Inventors: Thomas R. Cundiff, Edgewood, WA (US); Henry H. Bennett, Redmond, WA (US); Brad G. Lund, Auburn, WA (US); Robert S. Renz, Seattle, WA (US); Donald E. Wright, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/448,527

(22) Filed: May 30, 2003

(65) Prior Publication Data

US 2003/0183067 A1 Oct. 2, 2003

Related U.S. Application Data

(62) Division of application No. 09/826,478, filed on Apr. 4, 2001, now Pat. No. 6,589,618, which is a division of application No. 09/115,568, filed on Jul. 14, 1998, now Pat. No. 6,231,941.

(51) Int. Cl.$^7$ .............................................. B32B 31/16
(52) U.S. Cl. ....................................... 264/103; 264/257
(58) Field of Search ................................. 264/103, 257

(56) References Cited

U.S. PATENT DOCUMENTS

| | | |
|---|---|---|
| 2,273,480 A | 2/1942 | Yates |
| 2,533,715 A | 12/1950 | Conklin et al. |
| 2,979,982 A | 4/1961 | Weitzel |
| 3,035,476 A | 5/1962 | Fogden |
| 3,438,841 A | 4/1969 | Zumeta et al. |
| 3,805,667 A | 4/1974 | Orser |
| 4,150,920 A | 4/1979 | Belko et al. |
| 4,316,700 A | 2/1982 | Schramm |
| 4,624,097 A | 11/1986 | Wilcox |
| 4,640,179 A | 2/1987 | Cameron |
| 4,741,087 A | 5/1988 | Plummer, Jr. |
| 4,870,887 A | 10/1989 | Tresslar et al. |
| 5,197,370 A | 3/1993 | Gladfelter |
| 5,204,033 A | 4/1993 | Pearce et al. |
| 5,222,297 A * | 6/1993 | Graff et al. ............... 29/889.71 |
| 5,230,844 A | 7/1993 | Macaire et al. |
| 5,301,595 A | 4/1994 | Kessie |
| 5,308,228 A | 5/1994 | Benoit et al. |
| 5,320,494 A | 6/1994 | Reinfelder et al. |
| 5,525,423 A | 6/1996 | Liberman et al. |
| 5,569,508 A | 10/1996 | Cundiff |
| 5,633,074 A | 5/1997 | Muroi et al. |
| 5,794,504 A | 8/1998 | Starbile |

FOREIGN PATENT DOCUMENTS

| | | |
|---|---|---|
| FR | 2 610 386 | 8/1988 |
| GB | 2 121 920 | 1/1984 |
| JP | 61 014919 | 1/1986 |

* cited by examiner

*Primary Examiner*—Elizabeth M. Cole
(74) *Attorney, Agent, or Firm*—Christensen O'Connor Johnson Kindness PLLC

(57) ABSTRACT

A wind tunnel blade (30) connected to a base (32) and held in position by a two-piece cuff (34). The wind tunnel blade (30) is formed in a resin transfer molding process in which central, fore, and aft foam core sections (70, 72, 74) are placed together to form the wind tunnel blade (30). Radius fillers (120) are used to fill the gaps between the outer edge of the foam core sections. The radius fillers (120) used in the wind tunnel blade (30) are formed by a braided sleeve (122) surrounding a number of unidirectional tows (124). A tip (68) is formed separately from the rest of the wind tunnel blade (30) and is glued to the top thereof. Stacked layers of braided fibers (100) are used to reinforce the central core section (70).

11 Claims, 24 Drawing Sheets

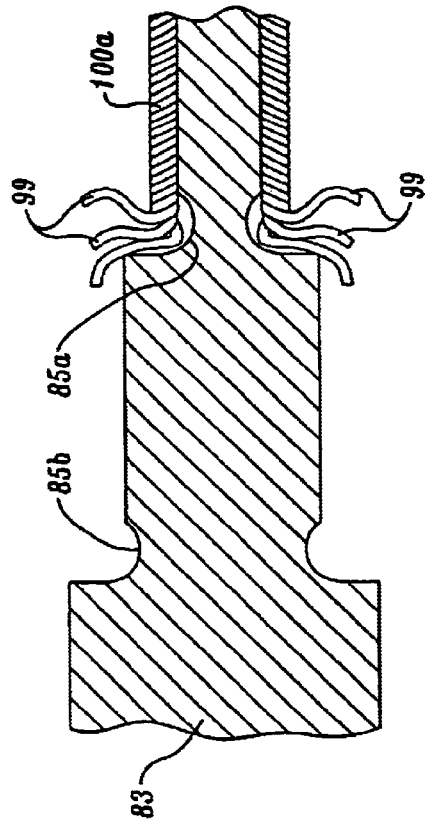
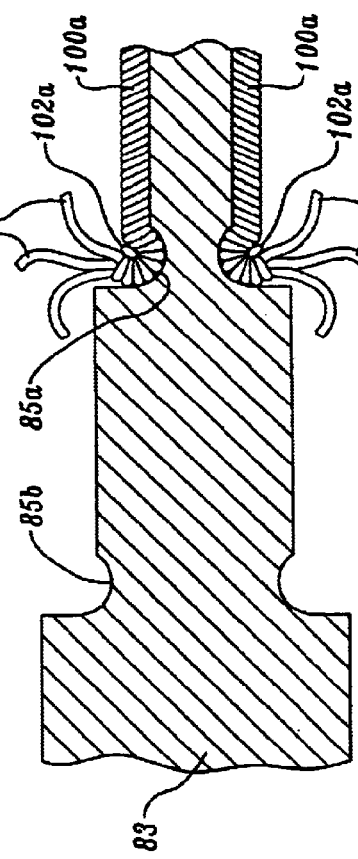
Fig. 12
Fig. 13

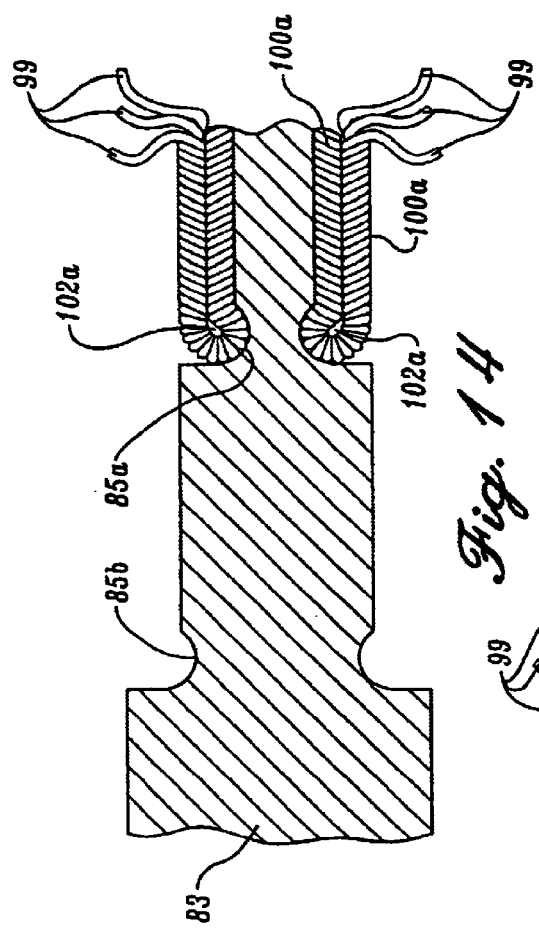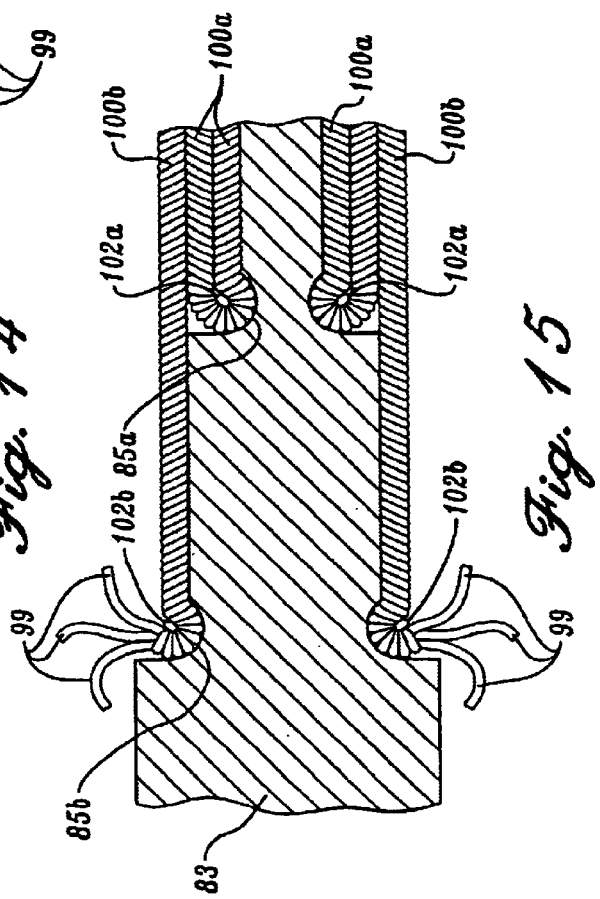

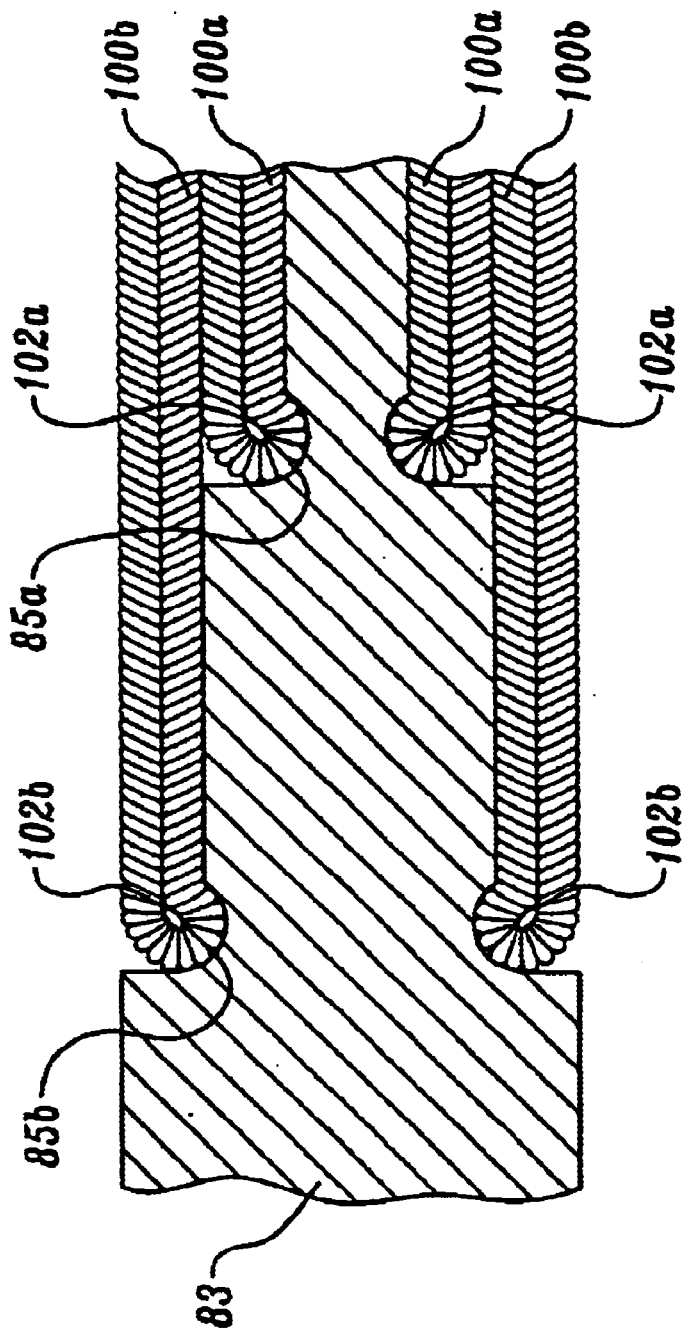

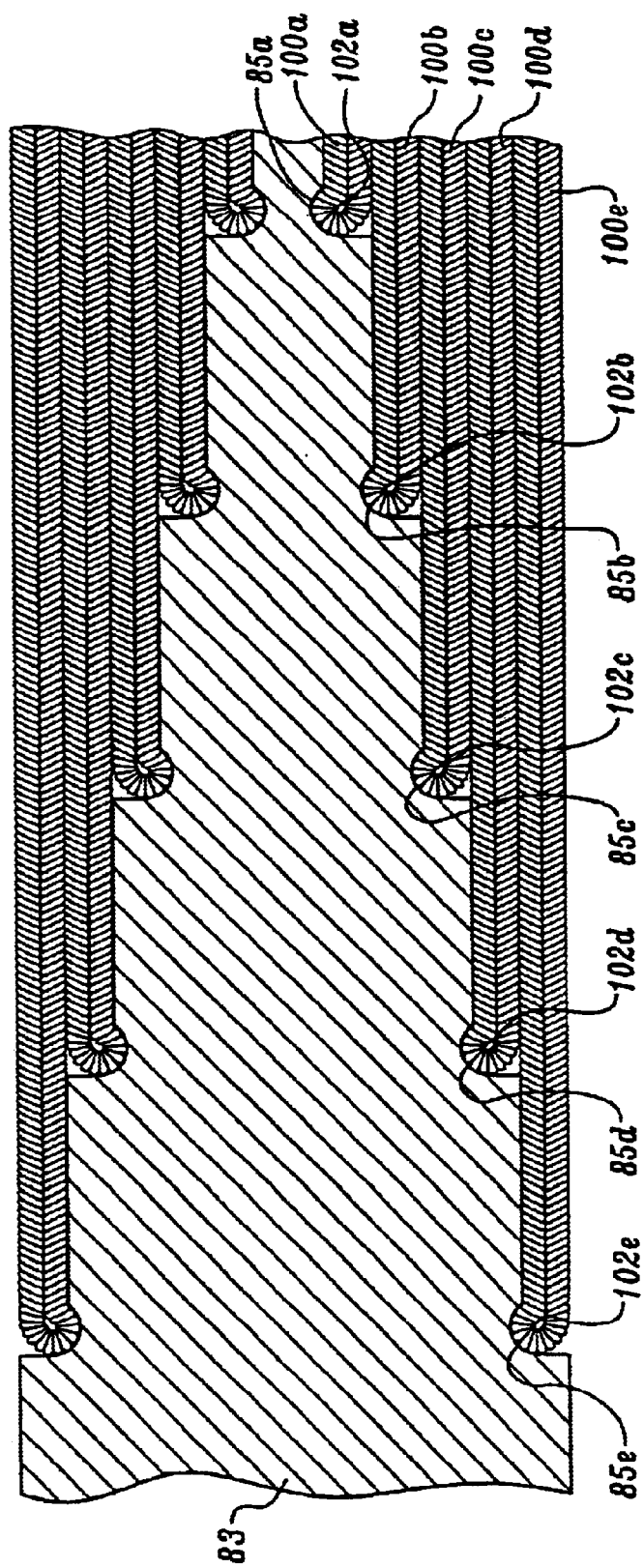

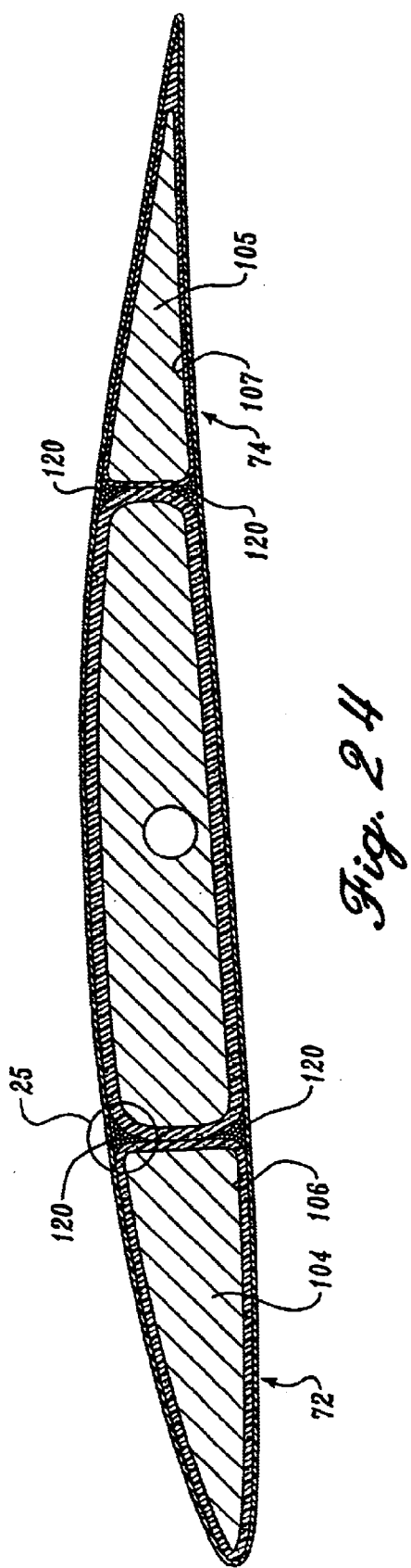
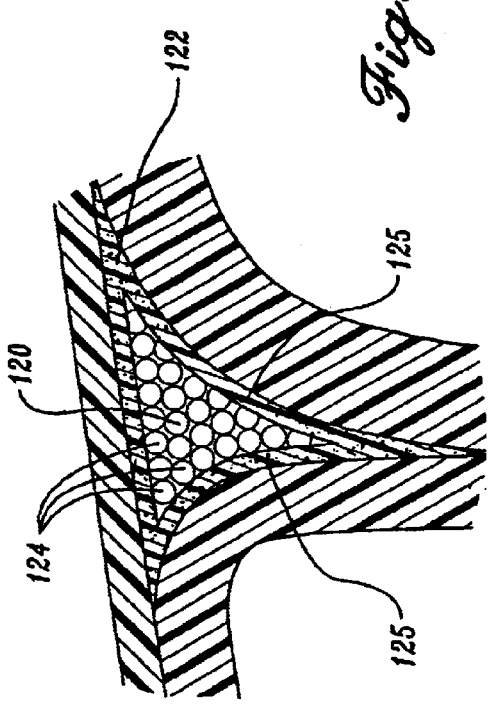

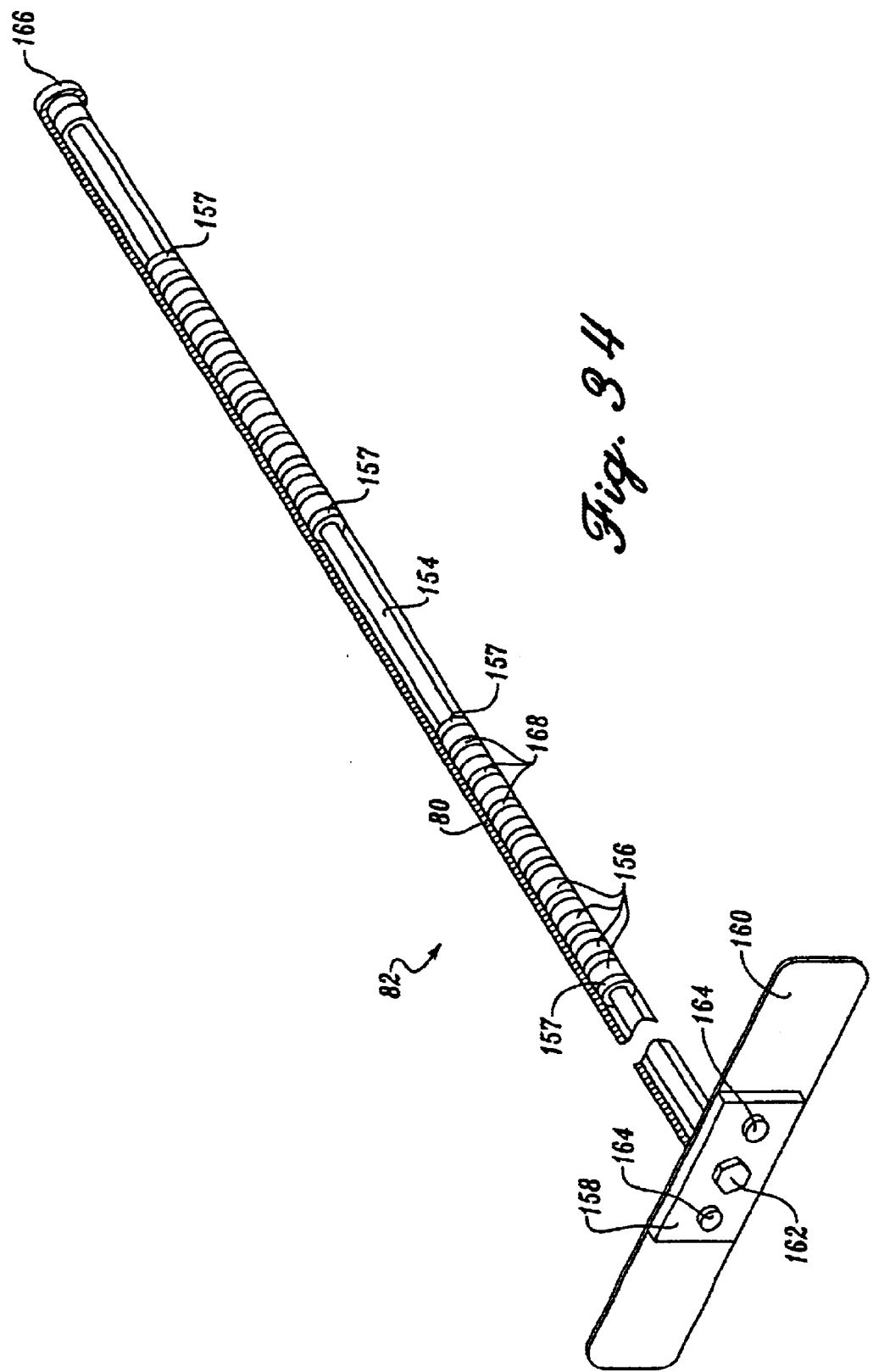

RESIN TRANSFER MOLDING PROCESS

RELATED APPLICATIONS

This application is a division of prior application Ser. No. 09/826,478, filed on Apr. 4, 2001, now U.S. Pat. No. 6,589,618, which is a division of prior application Ser. No. 09/115,568, filed Jul. 14, 1998, now U.S. Pat No. 6,231,941, priority from the filing dates of which is hereby claimed under 35 U.S.C. §120.

FIELD OF THE INVENTION

This invention relates to a process of resin transfer molding lightweight, foam-filled products and the strong, lightweight products made thereby. More particularly, the present invention is directed to a process of resin transfer molding a wind tunnel blade and the structure of the wind tunnel blade.

BACKGROUND OF THE INVENTION

Resin transfer molding has been around for many decades, and its use has grown considerably in recent years. The process allows the economical manufacture of high quality composites. In accordance with the process, a resin system is transferred at low viscosities and low pressures into a closed mold die containing a preform of dry fibers. The dry fibers, which may have the form of continuous strand mat, unidirectional, woven, or knitted preforms, are placed in a closed mold and resin is introduced into the mold under external pressure or vacuum. The resin cures under the action of its own exotherm, or heat can be applied to the mold to complete the curing process.

The resin transfer molding process can be used to produce low-cost composite parts that are complex in shape. These parts typically provide continuous fiber reinforcement, along with inside mold line and outside mold line controlled surfaces. It is the placement of the continuous fiber reinforcements in large structures that sets resin transfer molding apart from other liquid molding processes.

In the past, resin transfer molding was used for applications suitable to consumer product markets. However, in the last few years, through the development of high-strength resin systems and more advanced pumping systems, resin transfer molding has advanced to new levels. These recent developments have promoted resin transfer molding technology as a practical manufacturing option for high-strength composite designs, particularly in the aerospace industry.

In the aerospace industry, the most visible advantage to the resin transfer molding process lies in resin transfer molding's ability to combine multiple, detailed components into one configuration. For example, many traditional designs consist of many individual details that are combined as a subassembly. These subassemblies usually require labor-intensive shimming, bonding, mechanical fastening, and sealing. Consequently, these subassemblies demonstrate high part-to-part variability due to tolerance build-up.

Resin transfer molding produces an aerodynamic, decorative finish, with controlled fit-up surfaces. Being a product of the mold makes the surface quality of the part produced within the mold comparable to that of the tool's surface.

Resin transfer molding also provides control of the fiber/resin ratio in the completed product. This advantage produces parts that are lightweight and high in strength.

Unlike conventional composite systems that use lay-up of prepreg materials, resin transfer molding does not require an autoclave. Therefore, no autoclave costs are incurred, no size limitations are inherent, and no staging issues occur.

In terms of raw material cost, resin transfer molding offers cost savings by using bulk materials like broad goods. Because dry goods are less expensive than preimpregnated materials, savings can be associated with the cost of the wasted material during the ply-knitting operation. Also, bulk materials do not require special handling requirements such as freezer storage.

The basic injection operation of resin transfer molding is straightforward and easily learned. Hence, minimal training is required to bring operators on line. On the other hand, in making preforms, the level of operator skill and training is dependent upon the method of preforming that is used. Preform fabrication methods include braiding, knitting, weaving, filament winding, and stitching. Each of these methods is quite different and must be individually evaluated for specific design characteristics.

The initial capital investment costs of resin transfer molding are low when compared with many other molding processes. An elementary form of resin transfer molding can be achieved using a pressure pot, an oven, and a vacuum source. A variety of commercially available equipment can be used to enhance the process in many areas.

In most cases, resin transfer molded materials can be formed with minimal chemical exposure to workers and their environment. Many high-performance resin systems are stable and release low volatiles. Since resin transfer molding is processed within a closed system, workers are exposed to the resin only when loading the dispensing equipment.

One of the problems encountered when using resin transfer molding is that complex cavities that extend into the surface of the part must be formed in the mold cavity surface, or the complex cavity will be filled by resin during the resin injection process. If the complex cavity is designed to receive a bushing or an insert, the bushing or insert can be incorporated into the preform and injected in place to eliminate some higher level assembly and to avoid the need for a complex tooling surface. If the part includes an internal hollow tube, proper design of the tool to take this into account may be difficult and expensive, or may produce a tooling configuration from which removal of the finished part would be difficult.

Other problems are encountered in laying up or arranging preforms of fibers prior to placing the preform into the mold. If braided or woven fabric is used, cutting of that fabric often results in frayed edges, which is undesirable. Arranging stacks, or tapered-off sections of the preforms on a substrate so that ply drops are aligned correctly is also difficult.

The present invention solves many of the above problems by providing a series of unique processes for the fabrication of a wind tunnel blade. The processes result in a new structure for a wind tunnel blade.

It has become conventional practice in the aircraft industry to manufacture helicopter and other blades having a molded fiber-reinforced resin body formed by resin transfer molding. The fiber-reinforced resin bodies were often formed about an internal, metallic, load-bearing spar. Such fiber-reinforced resin bodies exhibited high strength and low weight characteristics. With the exception of the internal metal spar, however, prior art resin transfer molded rotor blades did not include structural reinforcements along their length.

Prior art wind tunnel blades were formed from a lay-up of prepreg composite material that was shaped into a unitary structure including a base attached to the blade. The housing and the hub for the wind tunnel blades required that a technician lay on his back and install the unitary base and blade structure into the wind tunnel's hub, which was difficult.

Because prior art wind tunnel blades were subjected to high speed wind conditions, the wind tunnel blades were often damaged as a result of fatigue and wind erosion. To counter this wind erosion, the prior art wind tunnel blades included frangible foam tips at their distal ends. The frangible foam tips were often formed of a foam material having a uniform density. The frangible foam tip was wrapped in plies of fiberglass to protect the foam from wind erosion and to improve impact resistance. This wrapped fiber piece was difficult to form, and required a large amount of labor to produce.

Prior art wind tunnel blades were difficult to balance because the wind tunnel blades were not of uniform weight and did not have consistent centers of gravity. The prior art wind tunnel blades were balanced by adding lead weights to the blade butt to adjust the center of gravity. After the center of gravity was adjusted, the blade must be matched to another blade of approximately the same weight. This matching process can be difficult because of the large blade-to-blade variation in weight.

The present invention solves the above problems by providing a novel wind tunnel blade design incorporating a variety of different features that permit easier installation, service, and replacement of the wind tunnel blades. The process of forming the unique wind tunnel blade incorporates a number of new composites forming techniques. These techniques are applicable to a number of parts or products, and can be used to form parts having a number of different configurations or complex shapes.

SUMMARY OF THE INVENTION

The present invention provides a plug including a flexible outer bushing having first and second ends, a connector attached to the first end of the bushing, and a fastener extending along the flexible outer bushing and attached to the connector. The fastener is configured such that actuation of the fastener causes the flexible outer bushing to expand outward, whereby the flexible outer bushing can be inserted into a hollow opening and can expand against the sides of the opening by actuation of the fastener.

In one embodiment, the connector is a female-threaded insert. The fastener can extend along the bushing and includes (1) an abutment surface for engaging the second end of the bushing and (2) male threads that are received in the female-threaded insert. Actuation of the fastener involves rotating the fastener to move the connector towards the second end.

In accordance with another aspect of the plug, the fastener extends along the bushing and comprises an abutment surface for engaging the second end of the bushing and actuation of the fastener comprises causing the fastener to pull the connector toward the abutment surface.

The present invention also provides a method of resin transfer molding a product having a hollow tube therein. The method includes placing an expandable plug into a hollow tube so that a portion of the plug extends along the intended finished line of the product being formed, and expanding the expandable plug so that the expandable plug is pressed against the outer sides of the hollow tube. Resin is injected about the hollow tube and around the plug in a resin transfer molding process such that excess resin is formed beyond the intended finish line. The excess resin and the expandable plug are cut along the intended finish line so that the plug is no longer expanded and falls out of the hollow tube.

The present invention further provides a reinforced core structure for use in a resin transfer molding process. The reinforced core structure includes an expanded core having a longitudinal axis, a first set of braided fibers extending from a first end of the expanded core to a first location and reversing from the first groove over itself and back towards the first end, and a second set of braided fibers extending from the first end over the first set of braided fibers and to a second location beyond the first location and reversing from the second location, back over itself and rearward to the first end.

In one embodiment, the expanded core includes a plurality of grooves extending transverse to the longitudinal axis.

In accordance with another aspect of the invention, a first groove is located at the first location, and a first cord ties off the first set of braided fibers and extends between the overlapped layers of the first set of braided fibers and opposite the first groove so that the first cord presses the first set of braided fibers into the first groove. A second groove can be provided that is located at the second location. A second cord ties off the second set of braided fibers and extending between the overlapped layers of the second set of braided fibers and opposite the second groove so that the second cord presses the second set of braided fibers into the second groove.

Preferably, the perimeter of the expanded core between the first and second grooves is substantially the same as the perimeter of the expanded core in the region between the first groove and the end and the overlapped layers of the first set of braided fibers extending over this latter area.

A third set of braided fibers can be provided that extends from the first end, past the first and second grooves, to a third groove beyond the second groove and reversing at the third groove over itself and back to the first end. A third cord can be provided that ties off the third set of braided fibers and extends between the overlapped layers of the third set of braided fibers and opposite the third groove so that the third cord presses the third set of braided fibers into the third groove.

Preferably, the perimeter of the expanded core between the first and second grooves and the overlapped layers of the second set of braided fibers extending thereover is substantially the same as the perimeter of the expanded core in the region between the second and third grooves.

The present invention further provides a method of forming a reinforced core structure for use in a resin transfer molding process. The method includes providing an expanded core having a longitudinal axis, braiding a first set of fibers from a first end of the expanded core to a first location on the expanded core, and reversing the direction of the braiding of the first set of fibers at the first location and continuing braiding back to the first end so that the first set of braided fibers is braided back upon itself to form a first dual layer fiber structure. A second set of fibers is braided over the first set of braided fibers from the first end beyond the first location to a second location. The braiding direction of the second set of fibers is reversed at the second location back toward the first end so that the second set of braided fibers is braided back upon itself to form a second dual layer fiber structure.

In accordance with one aspect of the method, the first set of braided fibers are tied at the first location with a cord before reversing direction of the braided fibers. The second set of braided fibers are tied at the second location with a cord before reversing direction of the braided fibers.

The expanded core can be provided with a plurality of grooves extending transverse to the longitudinal axis. A first groove is located at the first location, and the first set of braided fibers is tied with a cord before reversing direction of the first set of braided fibers. The cord is arranged opposite the first groove such as to pull the first set of braided fibers into the first groove. A second groove is located at the second location, and the second set of braided fibers is tied with a cord before reversing direction of the second set of braided fibers. The cord is arranged opposite the groove such as to pull the second set of braided fibers into the second groove.

The method further provides braiding a third set of fibers from the first end over the first and second sets of braided fibers to beyond the second groove to a third groove and reversing the braiding direction of the third set of fibers at the third groove back toward the first end so that the third set of braided fibers is braided back upon itself to form a third dual layer fiber structure.

In accordance with another aspect of the present invention, a method of preparing a reinforced core structure for a product to be formed in a resin transfer molding process utilizing a resin is provided. The method includes applying fibers over a core beyond the final finished line for the product to be formed, applying a tackifier solution to the fibers located at the final finish line, the tackifier solution comprising a reduced resin concentration from the final resin concentration of the product to be formed in the resin transfer molding process, locally consolidating the tackifier solution, and cutting along the final finish line.

Preferably, the tackifier solution includes resin to be used for the resin transfer molding process diluted by a solvent.

The present invention further provides a radius filler for use in a resin transfer molding system. The radius filler includes unidirectional tows and a braided sleeve of fibers extending around the unidirectional tows. A tackifier solution can be added to the braided sleeve, the tackifier solution comprising a diluted mixture of the resin to be used in the resin transfer molding system. The tackifier solution can include resin to be used for the resin transfer molding process diluted by a solvent.

The present invention further provides a method of forming a radius filler for use in forming a preform to be used in a resin transfer molding process, the method including providing unidirectional tows, and braiding a sleeve of fibers around the unidirectional tows. A tackifier can be applied to the braided sleeve, the tackifier including a diluted solution including the resin to be used in the final resin transfer molding process. The tackifier is consolidated so as to lend rigidity to the radius filler.

The present invention further provides a method of forming a core structure including providing a mold having an internal cavity, arranging a prepreg along the inside of the internal cavity, the prepreg being of a size such that the prepreg can extend around a circumference of the mold, placing an expandable foam material in the cavity of the mold and within the prepreg material, heating the expandable foam material so as to expand the foam material within the prepreg material so to press the prepreg material against the walls of the cavity of the mold, and curing the expandable foam material and the prepreg material so as to form the core structure.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 12 shows a diagrammatic side view of the core of FIG. 9, with braided fibers being applied around one end;

FIG. 13 is a diagrammatic side view similar to FIG. 12, with a portion of the braided fibers being tied off within a groove on the core;

FIG. 14 is a diagrammatic side view similar to FIGS. 12 and 13, showing the braided fibers being braided onto the core in an opposite direction over the first layer of braided fibers;

FIG. 15 is a diagrammatic side view similar to FIG. 14, showing additional braided fibers extending over the first braided fibers;

FIG. 16 is a diagrammatic side view similar to FIG. 15, with the second braided fibers in position;

FIG. 17 is a diagrammatic side view similar to FIG. 16, with five braided fibers in place on the outside of the core;

FIG. 24 is a sectional view of the wind tunnel blade of FIG. 7, taken along the sectional lines 24—24;

FIG. 25 is a detailed view of a radius filler formed in accordance with the present invention, taken in the detail section 25 of FIG. 24;

FIG. 34 is a side perspective view of a balance mechanism that is fitted within the wind tunnel blade of FIG. 1.

DETAILED DESCRIPTION OF THE PREFERRED EMBODIMENT

Figure 1:
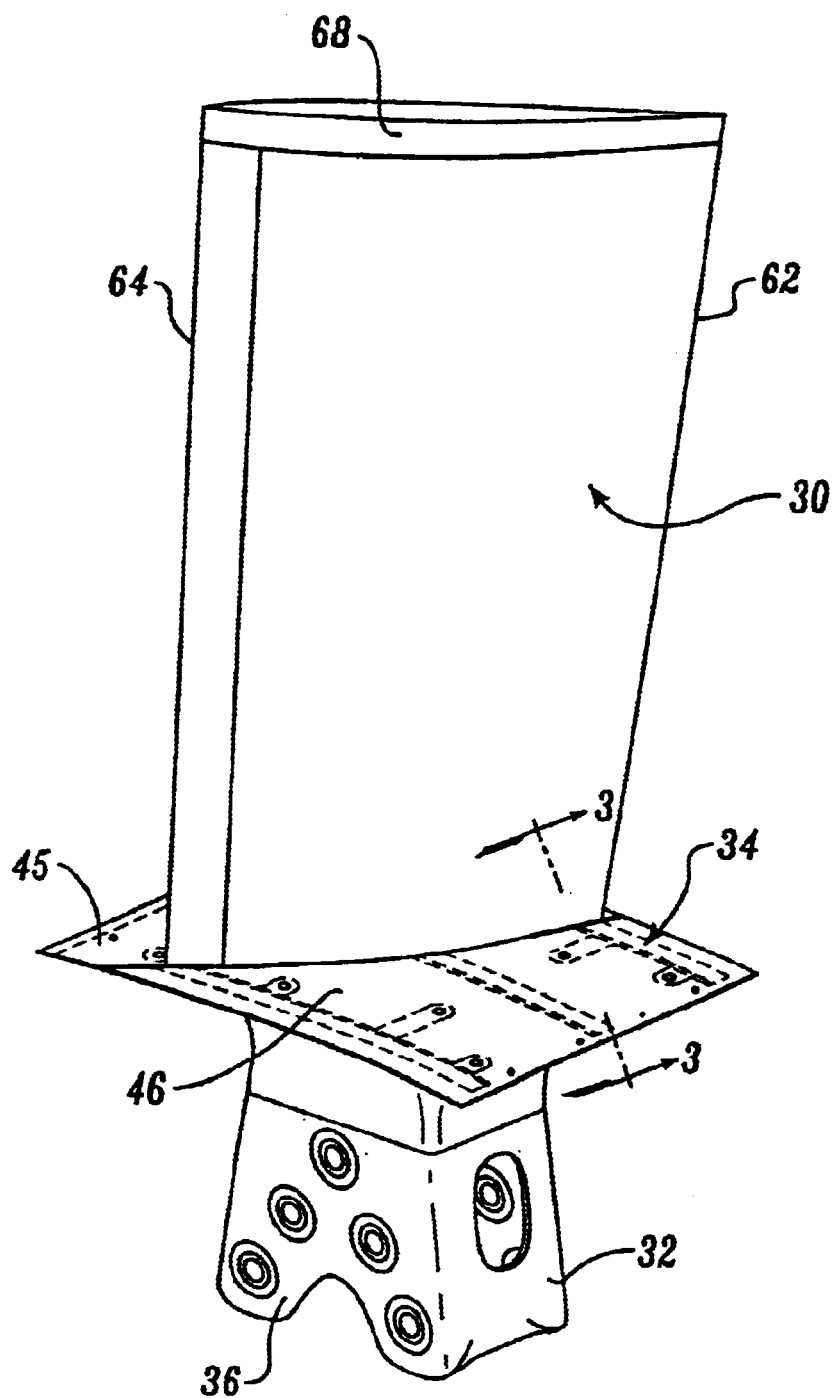
FIG. 1 shows a side perspective view of a wind tunnel blade made in accordance with the process of the present invention, the wind tunnel blade shown as mounted on a base that attaches to a wind tunnel fan hub.

Referring now to the drawing, in which like reference numerals represent like parts throughout the several views, FIG. 1 shows a wind tunnel blade 30 made in accordance with the present invention. The wind tunnel blade 30 is connected to a base 32 and is held in position by a two-piece cuff 34.

Briefly described, the present invention is directed to the separate wind tunnel blade 30, base 32 and cuff 34 system, and the unique configuration and structure of the wind tunnel blade 30. In addition, the present invention is directed to resin molding transfer processes for forming the wind tunnel blade 30.

The base 32 is designed to be attached to a hub of a wind tunnel fan (not shown). A plurality of the wind tunnel blades 30 project radially outward from the hub and are supported therefrom in a conventional fashion at the base 32. Any number of wind tunnel blades 30 can be used with the wind tunnel fan. As a nonlimiting example, the wind tunnel blade 30 shown in FIG. 1 is for use with a wind tunnel fan having seventy-two (72) wind tunnel blades spaced circumferentially about the hub for the wind tunnel fan. Since each wind tunnel blade 30 is identical, only a single wind tunnel blade will be described in this disclosure.

The base 32 is preferably cast aluminum, and includes a pedestal 36 (best shown in FIG. 2) that is configured to be attached to a rotating wind tunnel fan hub (not shown, but well known in the art). The pedestal 36 includes two legs 38 and five elongate bores 40 extending therethrough. The elongate bores 40 receive bolts (not shown) that are attached to the rotary wind tunnel fan hub in a manner known in the art.

A series of flanges 42 extend orthogonally from top corners of the sidewalls of the pedestal 36. The flanges 42 include downwardly extending mounting holes 44 that are configured to receive bolts (not shown) that extend through the cuff 34.

Figure 2:
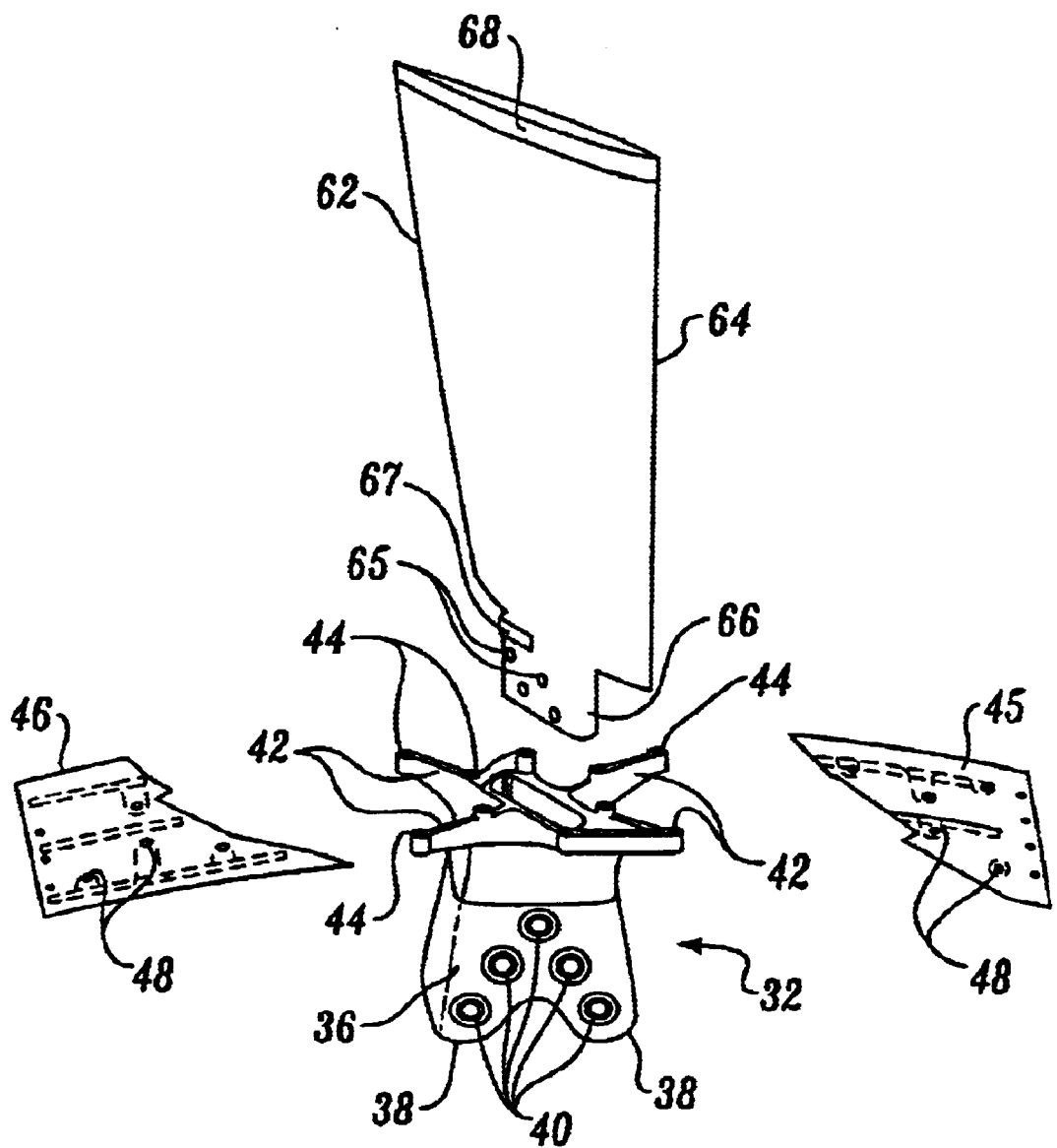
FIG. 2 is an exploded side perspective view of the wind tunnel blade and base of FIG. 1.
Figure 3:
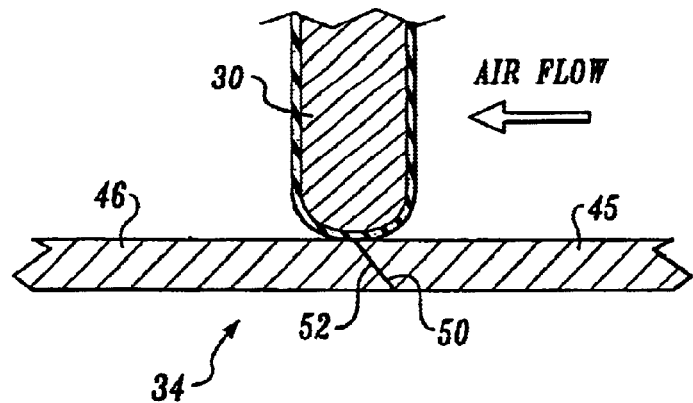
FIG. 3 is a sectional view taken along the section lines 3—3 of FIG. 1.

The cuff 34 includes a fore cuff piece 45 and an aft cuff piece 46 (best shown in FIG. 2). The fore and aft cuff pieces 45, 46 include holes 48 through which mounting bolts extend into the mounting holes 44 on the base 32. The fore cuff piece 45 and the aft cuff piece 46 include angled cuts 50, 52 (FIG. 3) that are configured to extend along and underneath the bottom edges of the wind tunnel blade 30. The angled cuts 50, 52 are preferably cut, one at an acute angle, the other at an obtuse angle, to the top plane of the fore cuff piece 45 and the aft cuff piece 46, and are arranged so that they fit together to form a smooth transition between the fore cuff piece 45 and the aft cuff piece 46. The angled cuts 50, 52 are shaped so that the surfaces of the two cuts extend forwardly and downwardly from the top surface of the fore and aft cuff pieces 45, 46. In this manner, air flow (see FIG. 3) over the top surface of the cuff pieces 45, 46 is not directed into the joint between the cuff pieces.

Figure 4:
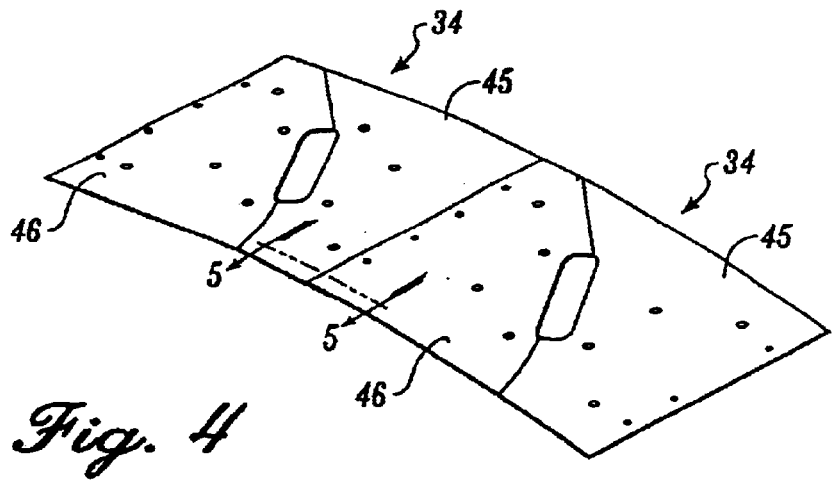
FIG. 4 is a side perspective view of adjacent cuffs for adjacent wind tunnel blades such as is shown in FIG. 1.
Figure 5:
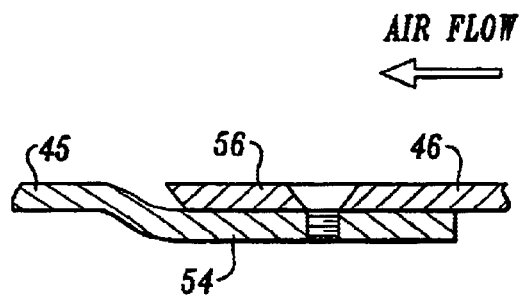
FIG. 5 is a sectional view taken along the section lines 5—5 of FIG. 4.

The fore cuff piece 45 and the aft cuff piece 46 are preferably compression molded using fiberglass in an epoxy resin. As can be seen in FIG. 5, the forward portion of the fore cuff piece 45 is formed with a stepped-downward section 54. A trailing, flat section 56 of the aft cuff piece 46 fits over the stepped-downward section 54 of the fore cuff piece 45. The stepped-down section 54 and the flat section 56 form an interconnected lap joint that is attached by nutplates (not shown, but of a typical model designed for composites) so that a series of the cuffs 34 creates a passive p-seal between the cuffs 34 (FIG. 4) that extend over the wind tunnel fan hub (not shown).

In summary, the cuff 34 includes three design features that contribute to preventing airflow leakage downward through the cuffs into the wind tunnel fan hub. First, the angled cuts 50, 52 form a split line that is angled away from air flow over the cuff 34 and is covered by the bottom edge of the wind tunnel blade 30. Second, the cuffs 34 are linked together so as to form a passive p-seal over the wind tunnel fan hub. Finally, the interconnected lap joint between the stepped-down section 54 of the fore cuff piece 45 and the flat section 56 of the aft cuff piece 46 prevents further leakage.

Referring back to FIG. 1, the wind tunnel blade 30 includes a rearward edge 62 and a rounded, leading edge 64. The wind tunnel blade 30 includes a tang root 66 (FIG. 2) that extends into a slot within the base 32 and attaches to the base 32 by bolts (not shown) through holes 65 in the tang root. The tang root 66 includes a protrusion 67 at the intersection of the tang root and the wind tunnel blade 30 that extends perpendicular to the longitudinal axis of the wind tunnel blade and along the aft, right top portion of the tang root 66. The aft cuff piece 46 fits over the protrusion 67, to add further stability and to help fix the wind tunnel blade 30 in position.

The wind tunnel blade 30 includes a separate tip 68 attached along the distal end of the wind tunnel blade. The function and the structure of the tip 68 are described in detail below.

Figure 6:
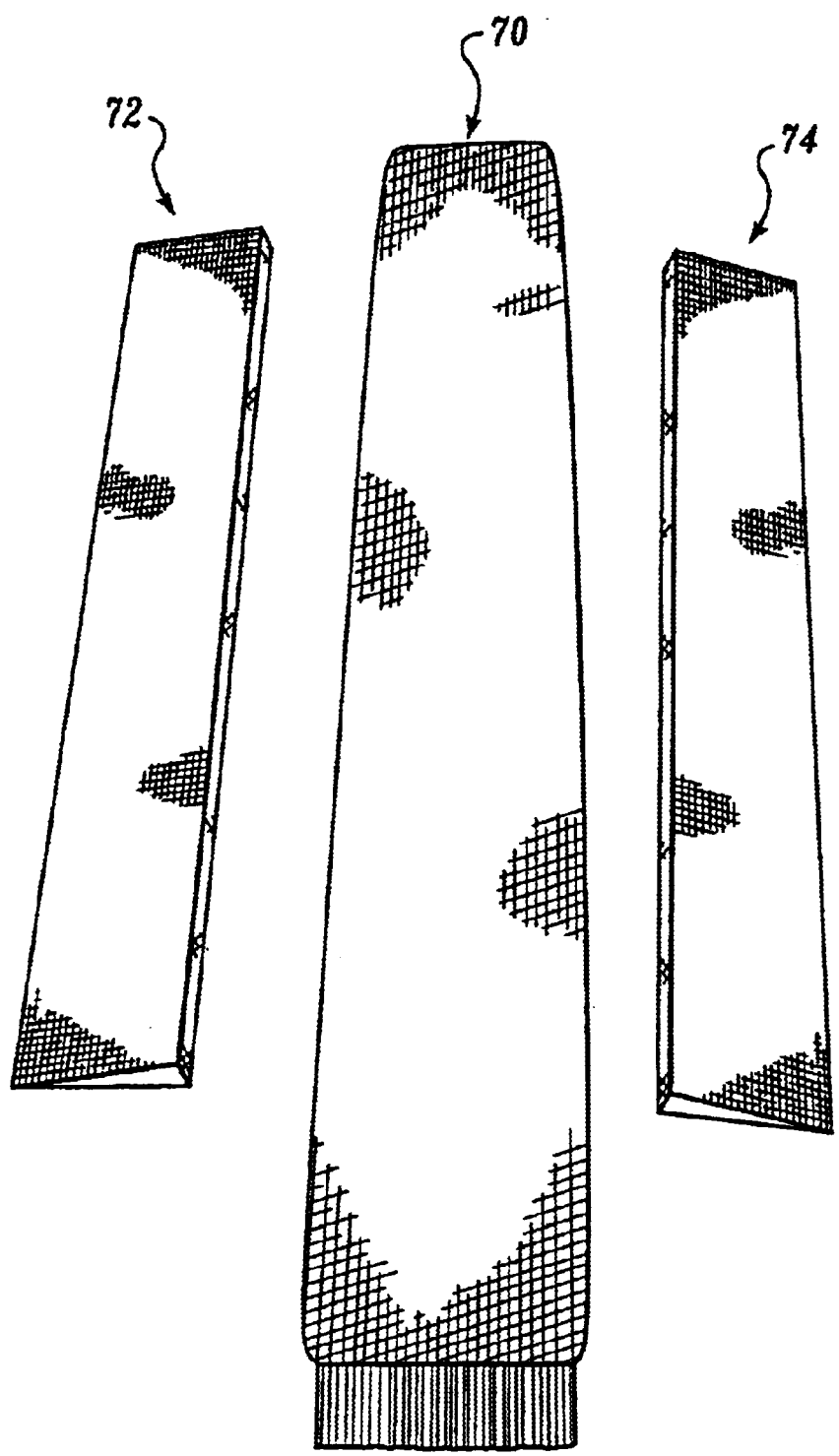
FIG. 6 is a top view of three foam core sections used to make the wind tunnel blade of FIG. 1.
Figure 7:
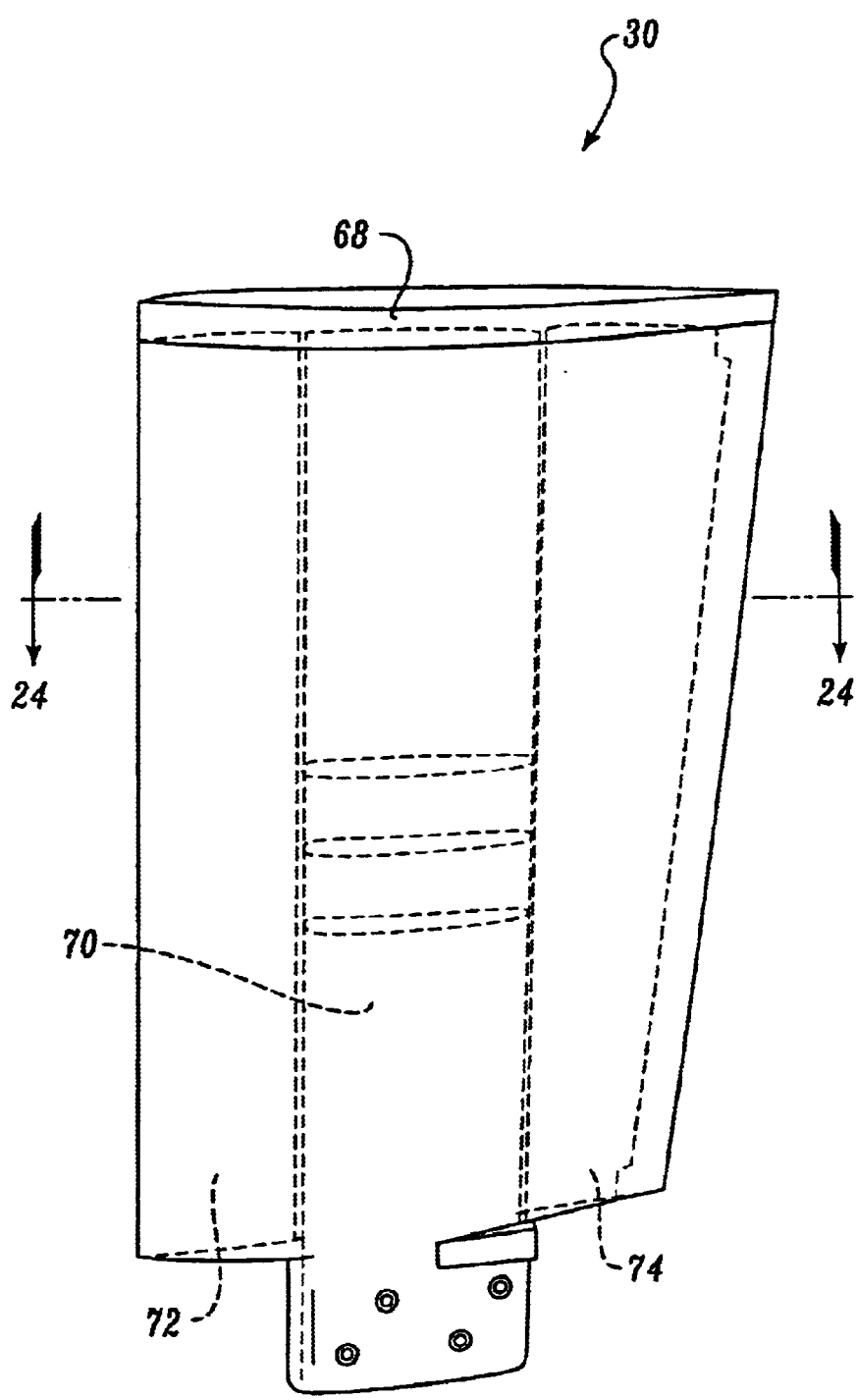
FIG. 7 is a perspective view of the wind tunnel blade of FIG. 1, with the core sections of FIG. 6 shown in phantom.

The method of forming the wind tunnel blade 30 will now be described. Describing the process broadly with reference to FIG. 6, the wind tunnel blade 30 is formed from a central foam core section 70, a fore foam core section 72, and an aft foam core section 74, each of which extends longitudinally the length of the blade. The central, fore, and aft core sections 70, 72, 74 are attached along their surfaces to form the body of the blade (FIG. 7). The central foam core section 70 extends downward beyond the bottom ends of the fore and aft core sections 72, 74 to form the tang root 66. The tip 68 is attached along the distal end of the foam core sections 70, 72, 74.

Figure 8:
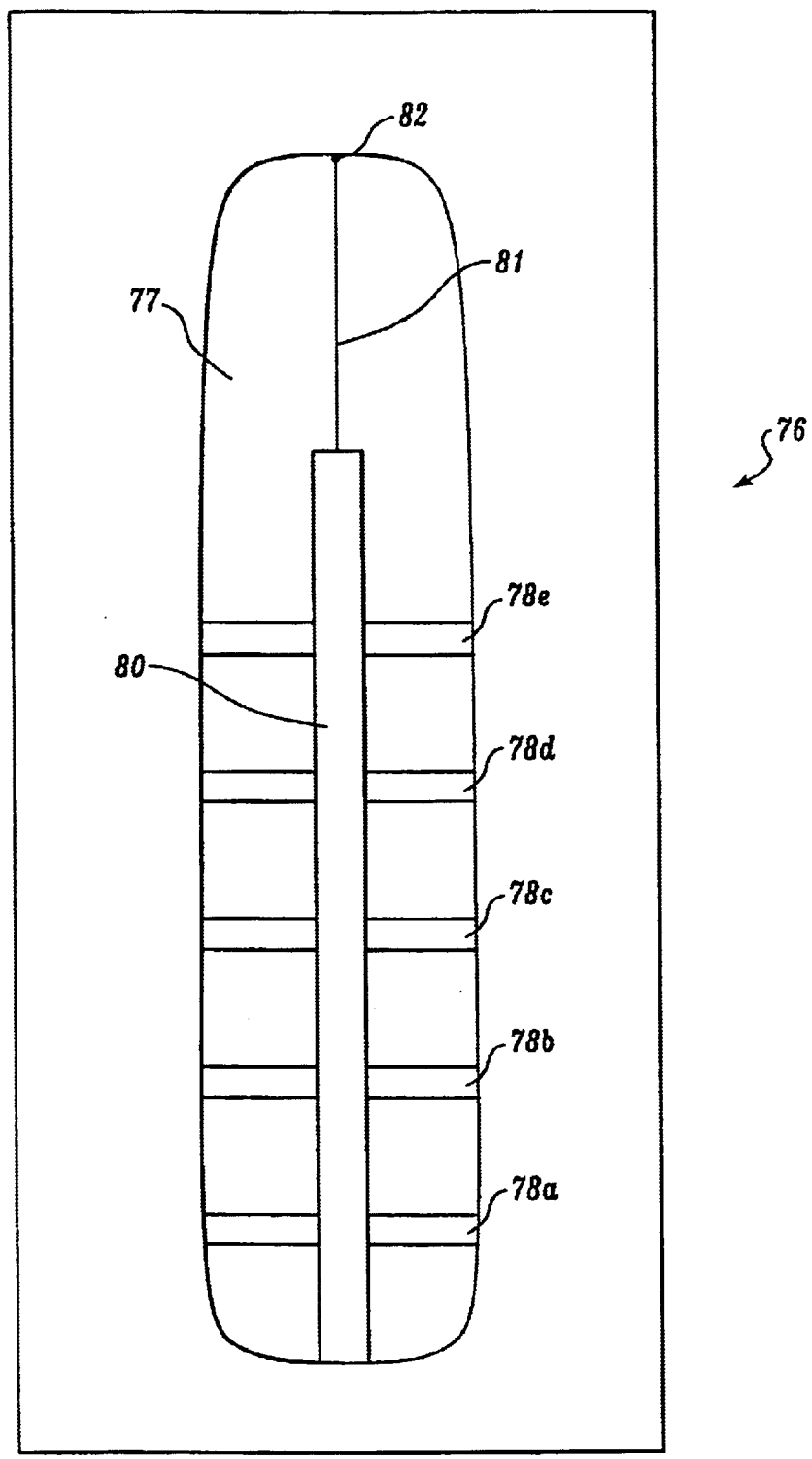
FIG. 8 shows a top plan view of the bottom mold for making the central core section of FIG. 6.

A bottom mold 76 for forming a foam core 83 (FIG. 9) for the central foam core section 70 is shown in FIG. 8. The cavity 77 for the bottom mold 76 substantially matches the outer contour of the desired finished product; i.e., the foam core 83. The mold cavity 77 includes protrusions 78a–e that extend transverse to the longitudinal axis of the bottom mold 76, and extend around the perimeter of the cavity, including a top for the mold (not shown) that is closed over the bottom mold 76 to form a closed cavity for formation of the foam core 83. A metal tube 80 is suspended by a wire 81 within the cavity 77 of the mold 76. Preferably, the wire 81 extends upward from the bottom of the cavity 77 (not shown). In the embodiment shown, the wire 81 is welded to the end of the metal tube 80, and extends into a small hole 82 at the end of the mold cavity 77. Many other arrangements for suspending the metal tube 80 with a wire can be used.

As is described in detail below, the foam core 83 is formed around the metal tube 80 so that the metal tube and the wire 81 become a part of the foam core and later a part of the central foam core section 70. The top portion of the metal tube 80 is plugged so as to prevent the flow of core therein. The bottom of the metal tube fits against a protrusion (not shown) in the mold cavity 77 to prevent flow in that end. The metal tube 80 is arranged so as to extend from the bottom portion of the foam core 83 (i.e., the end that forms the tang root 66) to a location approximately two-thirds of the length up the central foam core section 70. The metal tube 80 is designed to receive a balance mechanism 82 (FIG. 34), the function and structure of which are described in detail below. The metal tube 80 is preferably cylindrically shaped and formed from aluminum, but any appropriately shaped metal or other suitable material can be used.

After the metal tube 80 is in place, a polyurethane foam mixture (not shown) is poured into the mold cavity 77 and encapsulates the metal tube 80. The top mold (not shown) is placed over the bottom mold 76 to seal the cavity 77. The polyurethane foam mixture is heated until expanded to fill the mold and is held at a curing temperature until hardened. The polyurethane foam mixture and the metal tube 80 thus form a unitary structure of the foam core 83 for use in forming the central foam core section 70. The length of the foam core 83 after it is removed from the mold 76 is slightly longer than the final central foam core section 70 used to form the wind tunnel blade 30. The excess length represents excess foam at each end of the foam core 83 that is removed after a braided fiber shell has been placed around the foam core 83, as is described in detail below.

Figure 9:
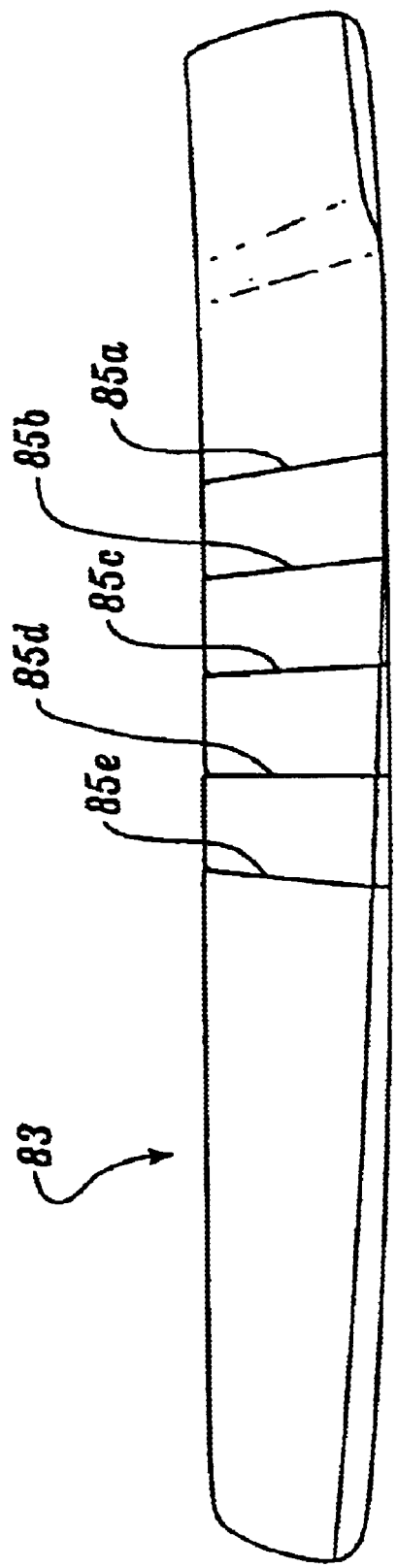
FIG. 9 shows the core for the central core section of FIG. 6.

As can be seen in FIG. 9, the final foam core 83 includes indentations, or grooves 85a–e that extend around the circumference of the foam core 83. The grooves 85a≧e are formed by the protrusions 78a–e in the mold cavity 77. The foam core 83 also tapers in circumference (i.e., decreases in perimeter) as the foam core approaches the bottom end (i.e., the tang root end). The decreases in perimeter occur in steps, and each of the steps begins at one of the grooves 85a–e. The functions of the stepped decreases in perimeter and the grooves are described in detail below.

Figure 10:
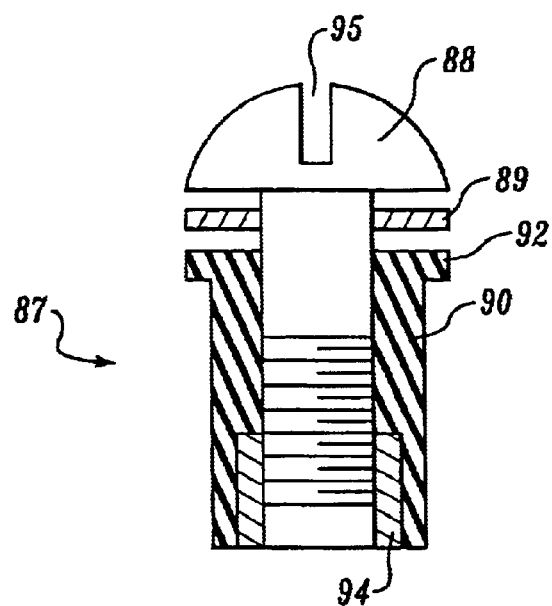
FIG. 10 shows a diagrammatic cutaway view of an expandable plug for use in formation of the core of FIG. 9.

An expandable plug 87 (FIG. 10) is placed in the open end of the metal tube 80. The expandable plug 87 includes a threaded fastener 88 that extends through a rubber-faced metal washer 89 and into a rubber bushing 90. The rubber bushing 90 has an internal diameter that substantially matches the outside diameter of the threaded fastener 88. The outer diameter of the bushing 90 is slightly smaller than the inner diameter of the metal tube 80. A flange 92 extends around the circumference of the top end of the rubber bushing 90. A threaded insert 94 is located within the internal circumference of the bore for the rubber bushing 90. A tool-receiving pattern 95 is located at the top end of the threaded fastener 88.

Figure 11:
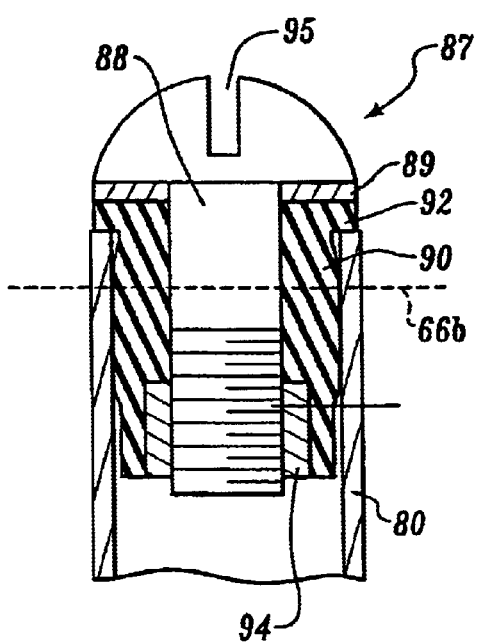
FIG. 11 shows the expandable plug of FIG. 10 in an expanded position and positioned within a metal tube.
Figure 18:
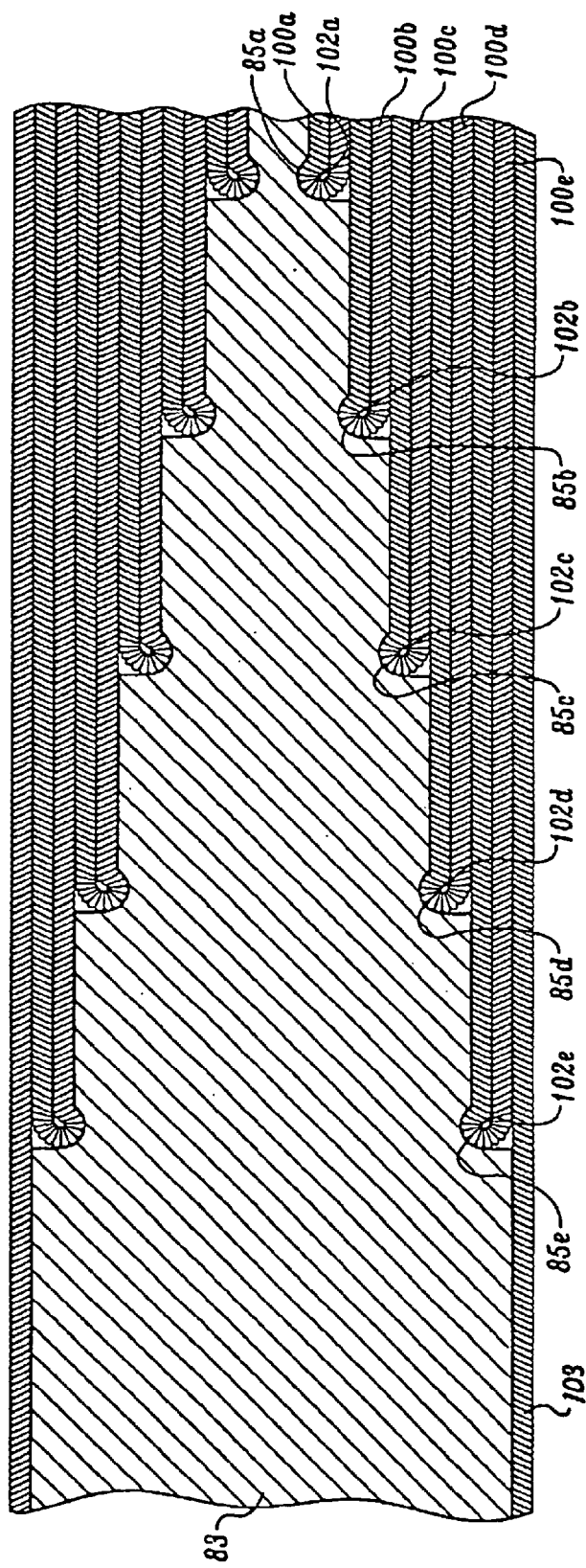
FIG. 18 is a diagrammatic side view similar to FIG. 7, with additional braided fibers over the outside of the core.
Figure 19:
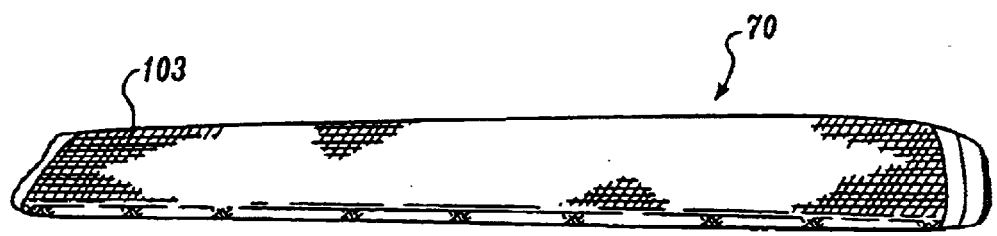
FIG. 19 is a side perspective view of the finished braided central core section shown in FIGS. 9–18.

The expandable plug 87 is placed in the end of the metal tube so that the flange 92 fits over the outer circumference of the metal tube. A tool, such as a screwdriver, is placed in the tool-receiving pattern 95 of the threaded fastener 88. The threaded fastener 88 is then rotated into the threaded insert 94 until the rubber face metal washer 89 is pressed against the flange 92 on the rubber bushing 90. Continued rotation of the threaded fastener 88 causes the rubber bushing to buckle (FIG. 11), and press outward on the sides of the metal tube 80, thus sealing the end of the metal tube 80.

After the expandable plug 87 is in place, fibers 99 (FIG. 12) are braided around the foam core 83, beginning at the bottom end so as to form a fiber sock 100a. The braided fiber sock 100a is preferably formed from fiberglass fibers, but can be graphite, aramid, ceramics, or any other suitable material. The fibers 99 are preferably braided onto the foam core 83, but can be knitted, woven, filament-wound, or stitched onto the foam core. Braiding results in the fibers being in an oriented pattern around the entire circumference of the foam core 83. The braided fibers 99 also form a snug-fitting preform around the foam core 83.

The fibers 99 are continually braided up the circumference of the foam core 83 until the braided fiber sock 100a extends beyond the first groove 85a (FIG. 12). A cord 102a (FIG. 13) is then placed around the braided fiber sock 100a opposite the first groove 85a. The cord 102a is preferably made of fiberglass; but any other suitable material can be used. The cord 102a is tensioned and tied off such that the braided fiber sock 100a extends downward into the groove 85a (FIG. 13). The braiding direction of the fibers is then reversed such that the braided fiber sock 100a overlaps itself (FIG. 14) and extends back to and beyond the bottom end of the foam core 83. The braided fiber sock 100a is then cut, and the free ends are permitted to dangle beyond the end of the foam core 83.

Preferably, the groove 85a is of a depth and size so that the fold in the braided fiber sock 100a where the braided fiber sock reverses direction is contained within the groove 85a, and thus a smooth surface is maintained at the transition (FIG. 14). Moreover, the perimeter of the foam core 83 between the groove 85a and the end of the foam core is a sufficient amount less than the perimeter between the grooves 85a and 85b such that, once the braided fiber sock 100a has been put in place, the outer surface of the return layer of the braided fiber sock is level with the outer circumference of the foam core 83 between the grooves 85a and 85b (FIG. 14).

After the braided fiber sock 100a is extended beyond the bottom of the foam core 83, the fibers are cut and a second braiding process begins from the bottom of the core over the initial braided fiber sock 100a. Instead of cutting the initial braided fiber sock 100a, the direction of braiding of the fibers can be reversed, and the A second braided fiber sock 100b (FIG. 15) is formed over the initial braided fiber sock 100a and over the outer circumference of the foam core 83 between the grooves 85a and 85b. Instead of cutting the initial braided fiber sock 100a, the direction of braiding of the fibers can be reversed, and the second braided fiber sock 100b can be formed by continued braiding of the first fiber sock. This method is preferred to cutting, because it does not produce frayed edges that must be kept in order.

The second braided fiber sock 100b is extended beyond the groove 85b (FIG. 15) and a second cord 102b is tensioned and tied over the second braided fiber sock 100b and pulled downward into the groove 85b. The direction of the braid for the braided fiber sock 100b is then reversed, and the braided fiber sock 100b extends rearward beyond the bottom of the foam core 83 (FIG. 16). The second fiber sock 100b is then cut, and a third fiber sock 100c is formed over the second fiber sock 100b (alternatively braiding is reversed, as described above). This process is continued until all of the grooves 85a–e have been filled, and five braided fiber socks 100a–e extend to the respective grooves 85a–e (FIG. 17), and extend rearward beyond the bottom end of the foam core 83. A final braided fiber sock 103 (FIG. 16) is then formed along the length of the foam core 83 over the braided fiber socks 100a–e and the exposed portion of the foam core 83. The final braided fiber sock 103 extends beyond both ends of the foam core 83.

The fore and aft foam core sections 72, 74 include foam cores 104, 105 (FIG. 24) formed in a manner similar to the foam core 83. That is, the foam cores 104, 105 are covered by braided fiber socks 106, 107. The braided fiber socks 106, 107 are placed on the foam cores 104, 105 so that the braided fiber socks extend beyond both ends of the foam cores. Unlike the foam core 83 for the central foam core section 70, the foam cores 104, 105 do not include step sections. Instead, only a single layer of fibers (the braided fiber socks 106, 107) extend the entire length of the fore and aft foam core sections 72, 74. Any number of layers of the braided fiber socks 106, 107 may be used over the foam cores 104, 105, but in the preferred embodiment, only one layer of the braided fiber sock is used on each of the foam cores.

After the central, fore, and aft foam core sections 70, 72, 74 are formed, the ends of the foam core sections are cut so as to remove excess material from the ends of the foam cores 83, 104, 105 and the excess braided fiber socks 100a–e, 103, 106, and 107. To cleanly cut the braided fiber socks 100a–e, 103, 106, and 107, a unique process has been developed. Because each of the foam core sections 70, 72, 74 are preferably cut in the same manner, the cutting process for only the central foam core section 70 will be described.

Figure 20:
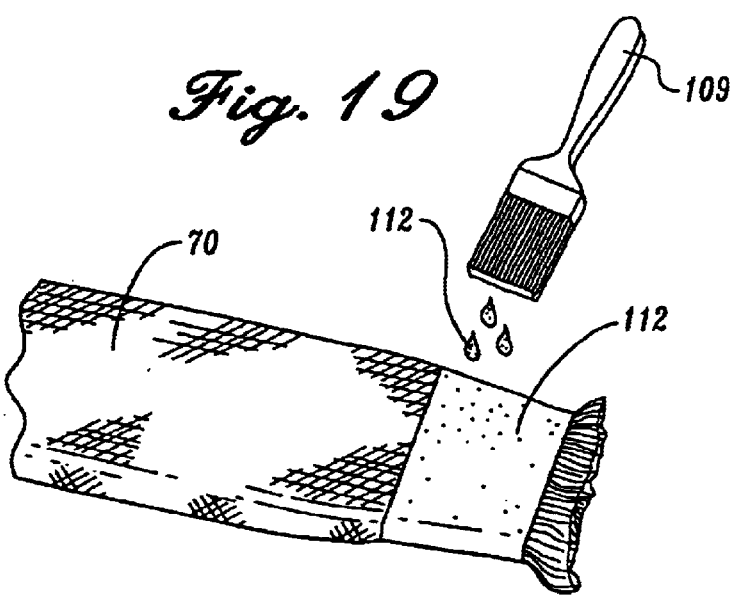
FIG. 20 shows the application of a tackifier to the end of the central core section of FIG. 19.

A tackifier 112 is applied by a brush 109 (FIG. 20) to the ends of the central foam core section 70. The tackifier 112 is preferably the base resin that will be used in the final resin transfer molding process of the wind tunnel blade 30, diluted in a solvent such as acetone. The tackifier 112 is applied at the location of the cuts, and overlaps the cuts in both directions by approximately half an inch. The tackifier 112 is applied in sufficient quantities to saturate through each of the braided fiber socks 100a–e, 103.

Figure 21:
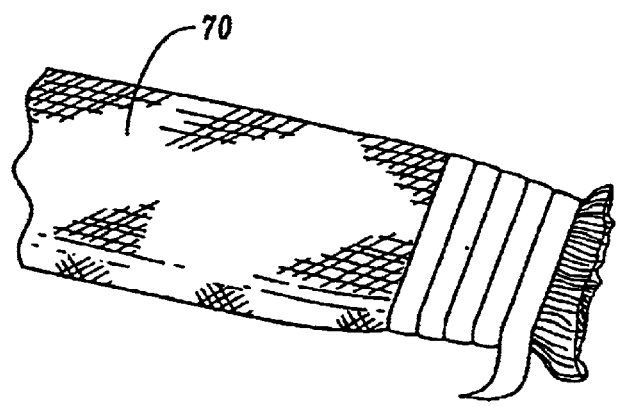
FIG. 21 shows shrink tape being applied over the tackifier that is applied in FIG. 20.

The tackifier 112 is locally consolidated by such methods as vacuum bag, shrink tape, or hard tooling until the polymer material is stable due to cooling of the hot melt or by flashing of the solvent from the solution. In the embodiment shown, shrink tape 113 (FIG. 21) is applied around and over the portion of the braided fiber socks 100a–e, 103 that has been saturated with the tackifier 112. The shrink tape 113 is heated to apply pressure and heat to the tackifier 112, causing the shrink tape 113 to constrict around the central foam core section 70 and apply pressure until the tackifier 112 precures (i.e., semi-hardens).

Figure 22:
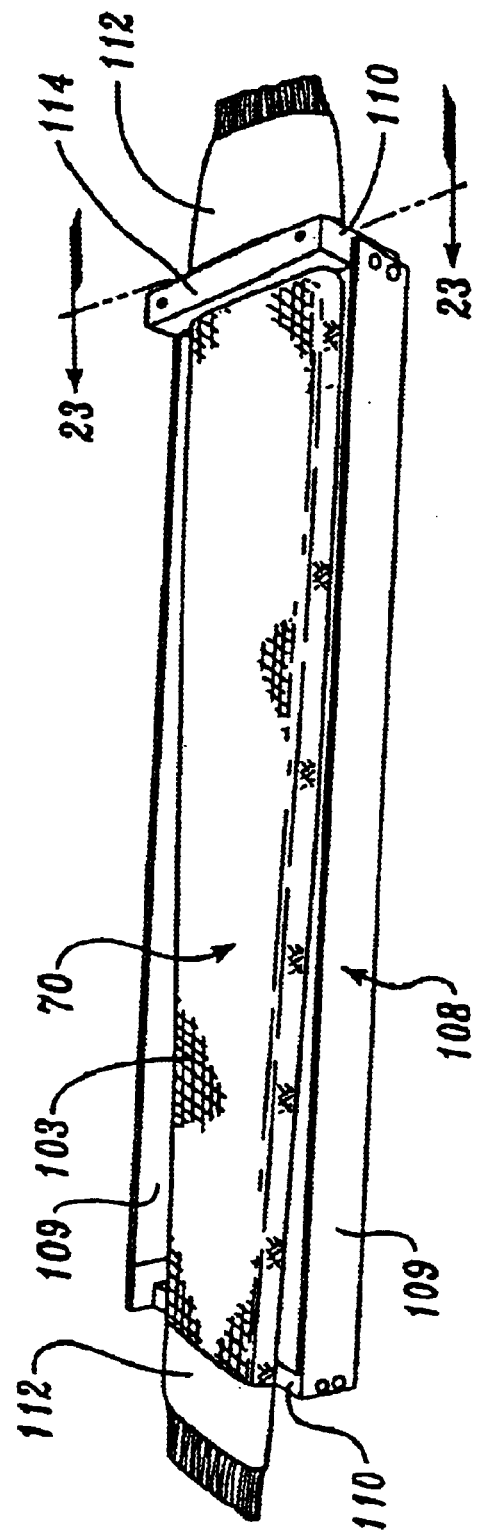
FIG. 22 shows the central core section of FIGS. 19–21 placed in a frame prior to cutting.
Figure 23:
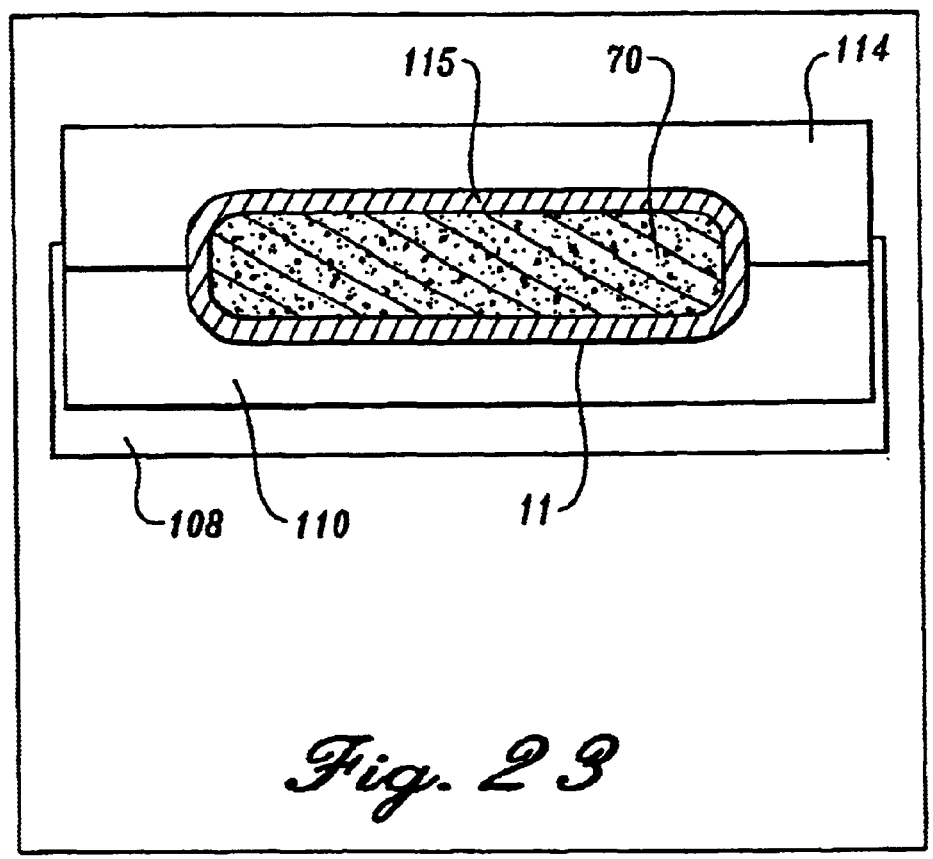
FIG. 23 is a sectional view of the central core section of FIG. 22, taken along the sectional lines 23—23.

The central foam core section 70 is then removed from the oven and placed in a frame 108 (FIG. 22). The frame 108 is designed as a four-sided box having sides 109 and ends 110. The sides 109 extend beyond the side edge of the central core section. The ends 110 of the frame 108 are spaced apart a length that is the same as the length of the finished central foam core section 70. The top surface of the ends 110 include indentations 111 (FIG. 23) that are designed to receive and support the ends of the central foam core section 70.

The uncut central foam core section 70 is placed on the frame 108 such that the excess materials for the foam core 83 and braided fiber socks 110a–e and 103 extend beyond the ends 110 of the frame. The portions of the central foam core section 70 upon which the tackifier 112 was applied align with the ends 110 of the frame.

After the central foam core section 70 is placed on the frame 108, brackets 114 are placed over opposite ends of the central foam core section opposite the ends 110 of the frame. The brackets 114 include indentations 115 (FIG. 23) that substantially match the contour of the upper side of the central foam core section 70. Thus, the brackets 114 and the ends 110 of the frame 108 work together to encase the central foam core section 70 at opposite ends of the central foam core section. The brackets 114 and the ends are then attached so as to hold the central foam core section 70.

The central foam core section 70 is then cut just along the outer edges of the ends 110 and brackets 114. The fact that the central foam core section 70 is clamped between the indentations 111, 115 on the ends 110 and the brackets 114 ensures that the central foam core section 70 is stable during the cutting process. In this manner, the braided fiber socks 100a–e, 103 are not pulled away from the foam core 83, and damage to the foam core 83 during the cutting process is minimized.

The tackifier 112 seals the braided fiber socks 100a–e, 103 against the outer surface of the foam core 83 and prevent fraying of the fiberglass within the braided fiber socks upon cutting of the socks. In this manner, smooth cuts are formed at the ends of the central foam core section 70.

The fore and aft foam core sections 72, 74 are prepared and cut in the same manner as the central foam core section 70. The central, fore, and aft foam core sections 70, 72, 74 are now ready for assembly.

As stated above, the central, fore, and aft foam core sections 70, 72, 74 are placed together to form the wind tunnel blade 30. Because the edges of the central, fore, and aft foam core sections 70, 72, 74 are rounded, radius fillers 120 (FIG. 24) are used to fill the gaps between the outer edge of the foam core sections. The radius fillers 120 used in the wind tunnel blade 30 are formed using a novel process. In accordance with the process, a braided sleeve 122 surrounds a number of unidirectional tows 124 (FIG. 25). The unidirectional tows 124 can be inserted into the bi-axial braided sleeve 122, or the braided sleeve can be formed around the unidirectional tows.

The core of the unidirectional tows 124 can be of uniform cross section, or can be varied in cross-section along its length so as to fit a particular gap. The radius fillers 120 of the wind tunnel blade 30 have a substantially uniform triangular cross-section, with two radiused, or curved sides 125. The curved sides 125 correspond to the sides that abut against adjacent foam core sections.

Figure 26:
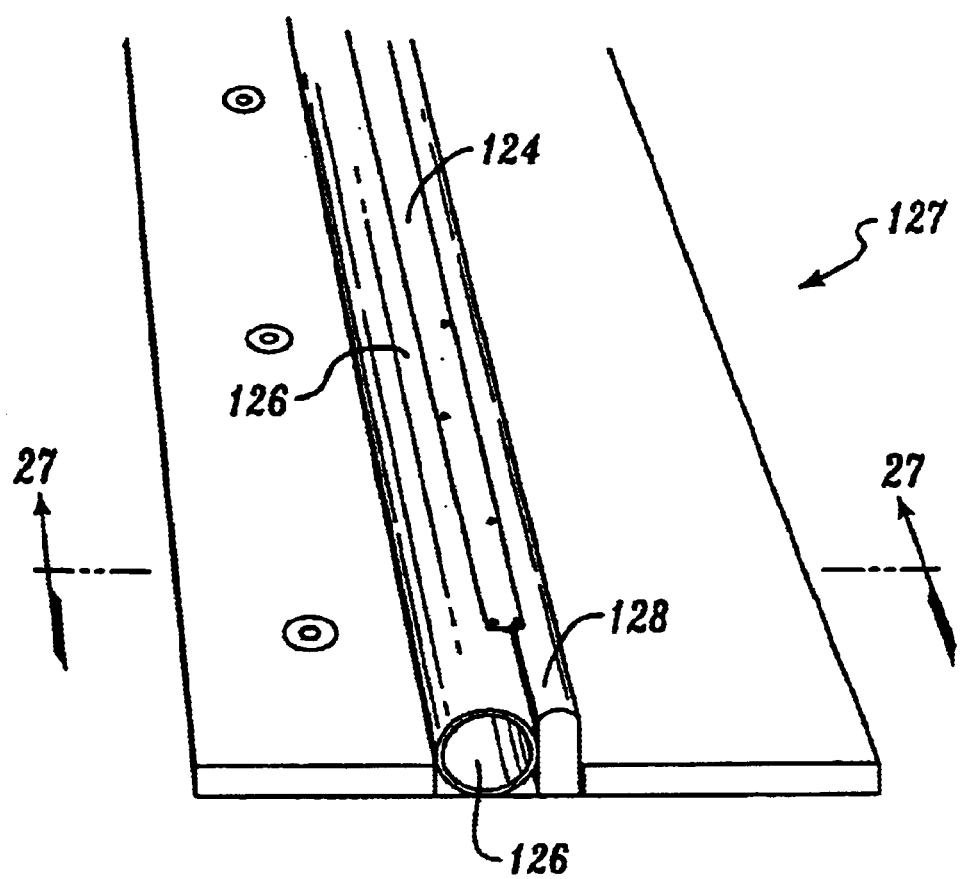
FIG. 26 shows a mandrel for formation of the radius filler of FIG. 25.

The radius filler 120 is formed on a mandrel 127 (FIG. 26) that includes a contoured surface that is substantially the same as the juncture of the two foam core sections 70, 72 or 70, 74, between which the radius filler will be placed. In the present invention, the mandrel 127 includes a first radiused mandrel surface 126 adjacent to a second radiused mandrel surface 128. The first radiused mandrel surface 126 in the example shown in the drawings is a pipe that has a radius that is substantially the same as the outer radius of the fore foam core section 72. The second radiused mandrel surface 128 is a machined metal that has a radius that is substantially the same as the outer radius of the central foam core section 70.

Figure 27:
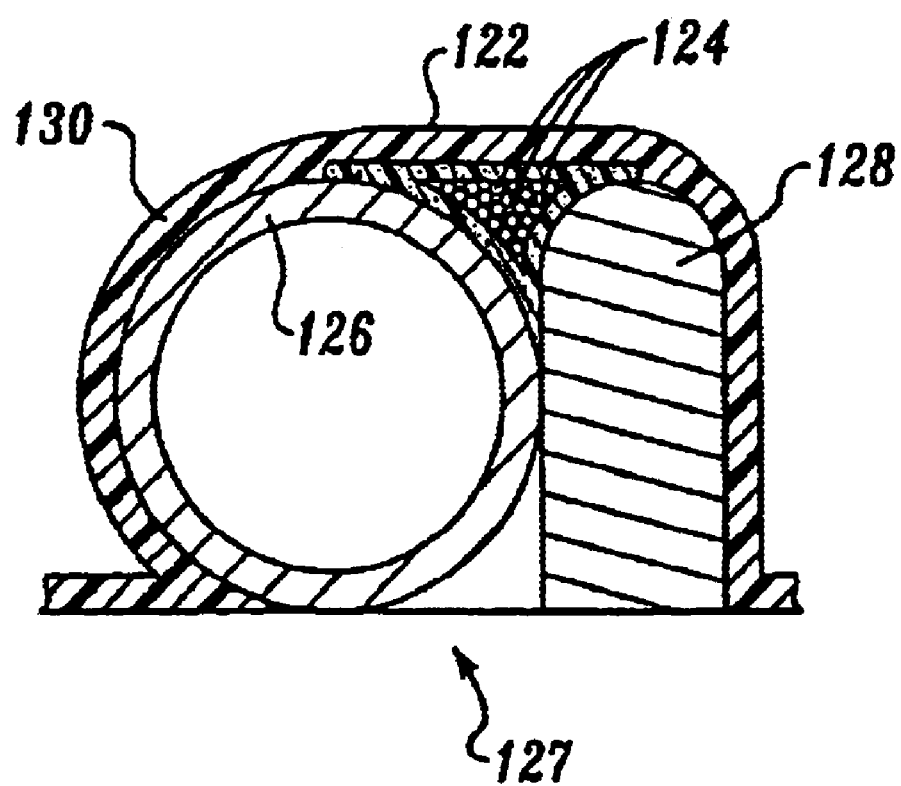
FIG. 27 is a sectional view of the mandrel of FIG. 26, taken along the sectional lines 27—27 and showing a vacuum bag in place over the mandrel.

The braided sleeve 122 is braided around the unidirectional tows 124, and is then soaked with a tackifier that is similar in composition to the tackifier 112 described in detail above. The braided sleeve 122 with the unidirectional tows 124 therein is then placed between the two radiused mandrel surfaces 126, 128, and is vacuum bagged under a bladder 130 (FIG. 27). The bagged radius filler 120 is then placed in an autoclave (not shown) and heat is applied while vacuum is applied to the bladder 130. The bagged radius filler 120 is heated until the tackifier on the braided sleeve 122 is precured, or semi-hardened.

The tackifier solution that is placed on the braided sleeve 122 places a resin coating over the braided sleeve so that the resin equals approximately 6% of the weight of the fibers in the resin. In contrast, in the final resin transfer molding process, the resin is approximately 50% of the weight of the resin and fiber composite. The amount of resin in the tackifier is preferably sufficient to maintain or hold the shape of the radius filler 120 after precuring, but is not sufficient to harden it into a rigid, cured state. Thus, the tackifier works as a binding agent to maintain consolidation and configuration of the braided sleeve 122 until the final resin transfer molding of the wind tunnel blade 30.

Each of the radius fillers 120 for the wind tunnel blade 30 are formed in a manner similar to the process described above. However, the radiused mandrel surfaces 126, 128 may have a different contour so as to produce radius fillers that fit between the respective foam core sections 70, 72, and 74.

Figure 28:
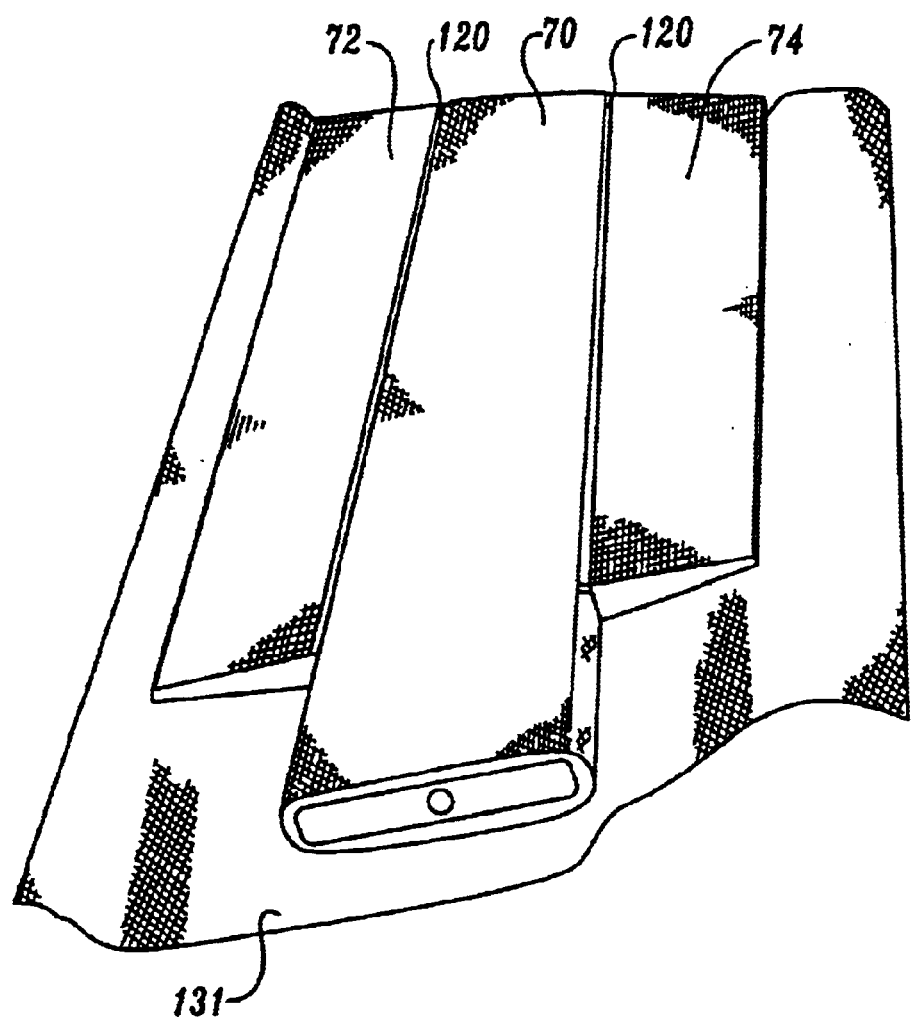
FIG. 28 shows the cut core sections of FIG. 6 in place and being wrapped by a prepreg sheet.

The formed central, fore, and aft foam core sections 70, 72, 74 and the radius fillers 120 are then consolidated into the shape of the wind tunnel blade 30. The entire assembly is laid over a tackified sheet 131 (FIG. 28) on a lay-up mandrel (not shown). The tackified sheet 131 is wrapped over the top of the assembly and is trimmed to fit the assembly. The assembly and the tackified sheet 131 are then vacuum bagged and precured. The consolidated assembly, called a "preform," is then ready for resin transfer molding.

Figure 29:
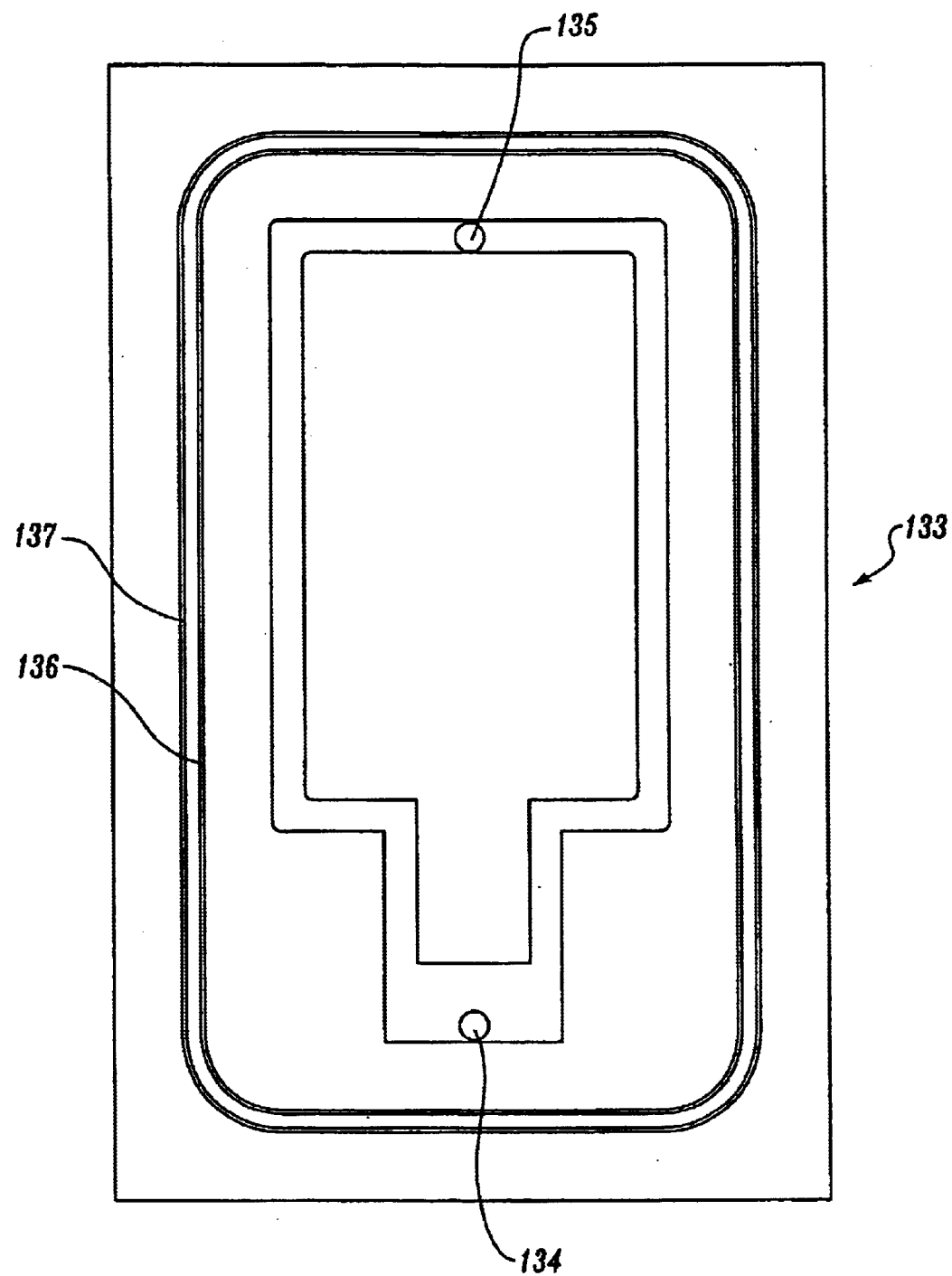
FIG. 29 shows a mold in which the fan tunnel blade of FIG. 6 is formed.

The preform is removed from the lay-up mandrel and is placed within a bottom mold 133 (FIG. 29) for the resin transfer molding process. The bottom mold 133 is contoured to the tang 60, leading edge 62, rearward edge 64, tang root 66, and the protrusion 67 of the wind tunnel blade 30. The bottom mold 133 includes an inlet 134 adjacent to the tang root 66, but is spaced approximately two inches therefrom. An outlet 135 is located at the top end of the bottom mold 133 for the outflow of resin. The bottom mold 133 includes inner and outer O-rings 136, 137, which provide a primary and secondary seal between the bottom mold and a top mold (not shown). The two O-rings improve seal performance to maintain vacuum during the resin transfer molding process, and the second seal 137 provides a backup to the primary seal 136 in case of primary seal failure.

The preform is carefully positioned in the bottom mold 133 with index locators. Once the preform has been set in place, the parting planes are inspected for possible ply mislocation or obstruction that will cause ply pinch and mold closure interference.

After the tool has been closed and the plumbing attached, the system is checked for vacuum integrity. This is commonly done with the vacuum source and a vacuum gauge at the resin trap. Shutoff valves can isolate the plumping for the entire system. After applying high vacuum, the system is allowed to stand static for up to five minutes to verify the level of vacuum stability. The vacuum assists the resin flow through the complex shapes with minimal porosity.

The bottom mold 133 and the upper mold are then heated to the resin system injection temperature, and the resin system is injected into the mold through the inlet port 134. The expandable plug 87 in the metal tube 80 prevents the resin system from flowing into the metal tube. The resin fills the void at the bottom end of the bottom mold 133 between the inlet 134 and the tang root 66. In addition, the resin penetrates all of the preforms within the system, including the braided fiber socks 100a–e, 103, 106, 107 and the tackified sheet 131. The inlet 134 and the outlet 135 are used to deliver the resin to and from the mold.

The resin for the wind tunnel blade 30 is preferably Epon dpl 862 RTM liquid resin with the Epon curing agent W added as a curing additive, available from Shell Chemical Company, but other resins or other resin systems can be used. When selecting a resin for a transfer molding resin design, the first step is to clearly define the performance conditions. Some of the performance criteria include the range of operating temperatures, thermal cycles, and mechanical properties. To insure the proper resin selection, the resin properties must be evaluated based on the performance conditions. A wide variety of resin systems are available for use in the present invention, along with many others that are in the development stage. Some of the generic resin transfer molding resin systems that can be used include: epoxy resin systems; cyanate ester resin systems; vinyl ester resin systems; phenolic resin systems; polyester resin systems; and bismaleimide resin systems.

Ideally, the resin injection procedure creates a constant-flow front, with complete fiber wet-out on a microscopic level, and achieves total mold cavity fill. The recommended way to create a constant-flow front is to use an injection system that maintains positive displacement at low pressure. Sustaining a low resin viscosity through the injection cycle helps to control the pumping pressure. Another aid to achieving total fiber wet-out and mold fill is to conclude the injection cycle with an appropriate hydrostatic pressure. The hydrostatic pressure should be maintained until the resin matrix is well within its gel phase. The level of hydrostatic pressure is governed by the type of resin system, mold design, and supporting equipment.

Figure 30:
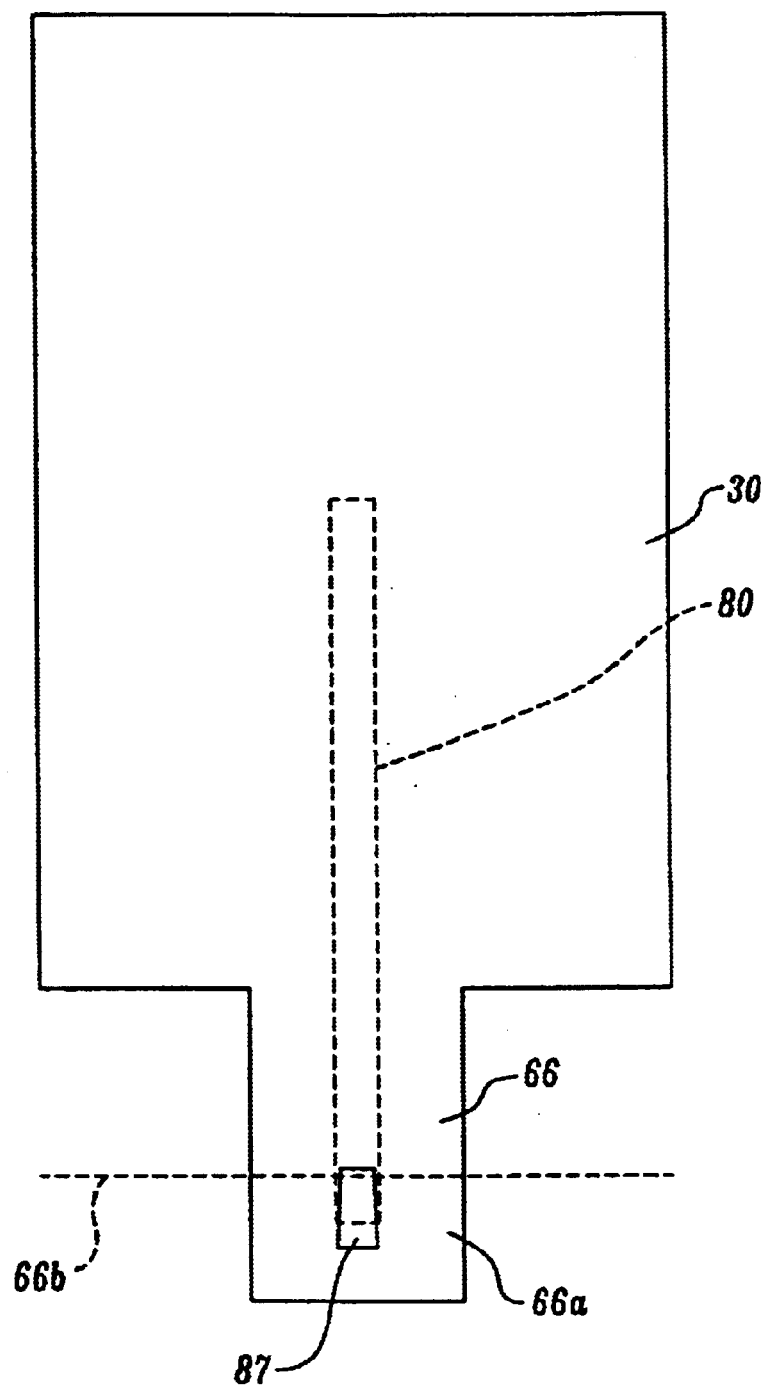
FIG. 30 is a diagrammatic view of the wind tunnel blade of FIG. 6, as removed from the mold of FIG. 29, and displaying a cut line along which the wind tunnel blade is cut before finishing.
Figure 31:
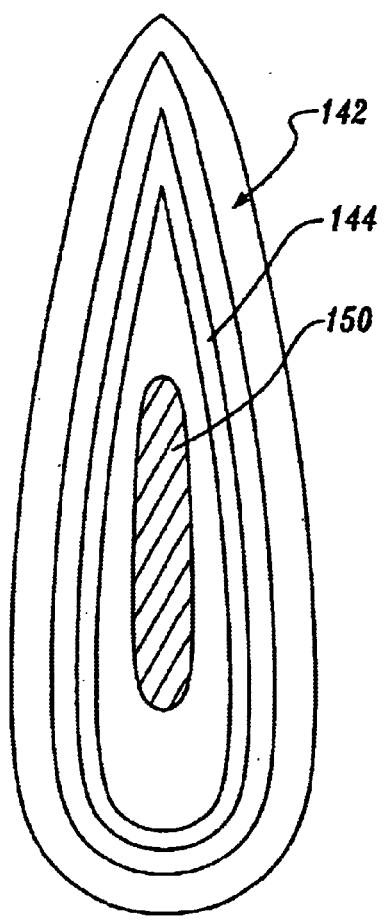
FIG. 31 shows a mold in which the tip for the wind tunnel blade of FIG. 1 is formed, the mold having foam material and an outer skin therein.
Figure 32:
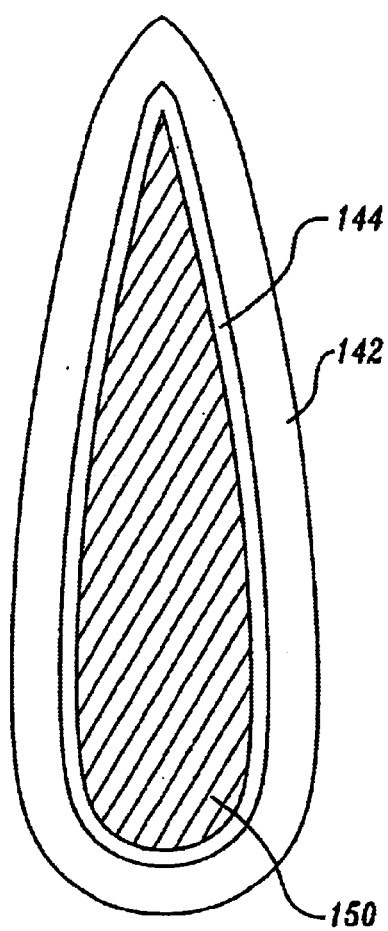
FIG. 32 is a diagrammatic view of the mold of FIG. 31, with the foam material expanded and the outer skins pressed against the inner mold line of the mold.

After the resin is completely injected into the preform, the temperature of the mold is increased to the cure temperature for the resin system. The mold is held at this temperature for a sufficient time to cure the resin. After curing is complete, the wind tunnel blade 30 is removed from the mold and the excess resin 66a at the tang root 66 is sheared off along the line 66b shown in FIG. 30. When the excess resin 66a is cut off the tang root 66, the metal tube 80 and the expandable plug 87 are also cut, generally along the dotted line 66b shown in FIG. 30. After the excess resin 66a and the portions of the metal tube 80 and expandable plug 87 are removed, the threaded fastener 88 is cut in half, releasing the rubber bushing 90 of the expandable plug 87 so that the rubber bushing 90 is no longer forced against the sides of the metal tube 80, and simply falls out. Alternatively and preferably, a cut can be made so that the entire expandable plug 87 is cut out and falls out, and the tube and the expandable plug 87 (still filly expanded) are separated from the final product.

The tip 68 is formed separately from the rest of the wind tunnel blade 30. To form the tip 68, a teardrop-shaped mold 142 having a mold cavity that substantially matches the shape of the tip is used. An outer skin 144, preferably a prepreg sheet of material (fibers impregnated with a resin), is placed within the mold 142. The outer skin 144 wraps substantially around the inside mold cavity 143 of the mold 142.

Figure 33:
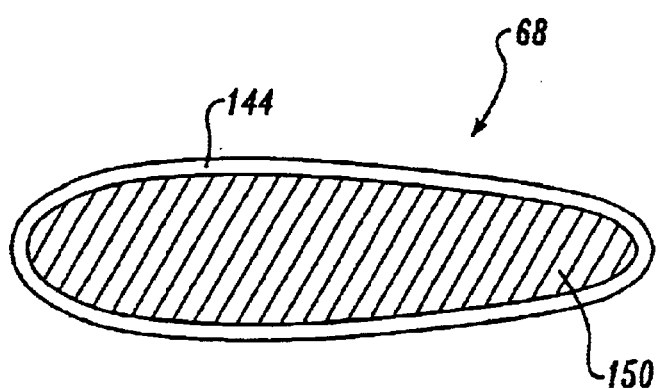
FIG. 33 is a top view of the wind tunnel blade tip formed in the mold of FIGS. 31 and 32.

Foam material 150 is placed inside the outer skin 144. The mold 142 is then placed in an oven and heated so that the foam material 150 expands. During this expansion process, the outer skin 144 is pressed outward against the mold cavity 143. The resin in the outer skin 144 cures during the same process, and a tip 68 is formed (FIG. 33) that has a foam core with a hard, outer skin 144. The tip 68 is then glued to the top end of the molded wind tunnel blade 30.

The balance mechanism 82 is shown in FIG. 34. The balance mechanism 82 is inserted into the metal tube 80 after the resin transfer molding process. The balance mechanism 82 includes a threaded rod 154 that extends the length of the metal tube 80. Ballast weights 156 are located along the length of the threaded rod 154. A metal plate 158 is secured to the end of the threaded rod 154 by a jam nut 162. An end cap 160, that is sized and shaped to fit against the end of the tang root 66, is bonded to the end of the tang root. The plate 158 is held against the end cap 160 by bolts 164. The bolts 164 extend upward into the end cap 160.

The distal end of the threaded rod 154 includes a tube cap 166 that is sized so as to receive the end of the threaded rod and to position the threaded rod laterally within the metal tube 80. Each of the ballast weights 156 include grooves on the outer surface thereof for receiving O-rings 168. The O-rings 168 bear against the inner surface of the metal tube 80 to minimize vibration of the ballast weights 156. Thus, the O-rings 168 are located along the length of the threaded rod 154 and position the threaded rod within the metal tube 80. The ballast weights 156 and O-rings 168 are held between pairs of jam nuts 157.

In practice, the wind tunnel blade 30 is balanced by the balance mechanism 82. The balance mechanism allows both the weight and the center of gravity of the wind tunnel blade 30 to be adjusted. The number of ballast weights 156 can be varied by removing or adding ballast weights 156 to the threaded rod 154. The position of the ballast weights 156 along the threaded rod 154 can be varied by moving the jam nuts 157 up and down the length of the threaded rod 154, which in turn moves the ballast weights 156 up and down the threaded rod. In this manner, both the weight and the center of gravity of the wind tunnel blade 30 can be adjusted.

As can be understood from the foregoing, the present invention provides numerous advantages in the structure of the wind tunnel blade 30 over wind tunnel blades of the prior art. The separate wind tunnel blade 30, base 32, and cuff 34 provide ease of maintenance. If damage to the wind tunnel blade 30 occurs, the wind tunnel blade can be released from the base 32 and the cuff 34, and a new wind tunnel blade can be installed. In contrast, in prior art wind tunnel blades, the blade, base and cuff were a single structure, and had to be replaced upon damage to the wind tunnel blade.

The two-piece cuff 34 allows access to the wind tunnel blade 30 by removing only one of the fore cuff piece 45 or the aft cuff piece 46. In addition, the cuff 34 minimizes air flow leakage downward through the cuffs into the wind tunnel fan by providing the angled cuts 50, 52 that form a split line that is angled away from air flow over the cuff 34 and is covered by the bottom edge of the wind tunnel blade 30. In addition, adjacent cuffs 34 are linked together so as to form a passive p-seal over the wind tunnel fan hub. The interconnected lap joint between adjacent cuffs 34 is also designed to prevent leakage.

Resin transfer molding provides smooth finished surfaces on both sides of the wind tunnel blade 30. In contrast, prior art prepreg lay-up methods provided a single surface that was formed against a tool and that was smooth. The smooth surfaces provided by resin transfer molding provide an aerodynamic, decorative finish, with controlled fit-up surfaces.

The new construction of a tip 68 for the wind tunnel blade 30 provides an improved structure and ease of construction not provided by the prior art.

The radius filler 120 provides several advantages over prior art radius fillers. In the prior art, radius fillers were most often formed by prepreg materials that were formed into the shape of the radius fillers. In contrast, the radius filler 120 of the present invention provides unidirectional tows 122 within a bi-axial braided sleeve 124. The unidirectional tows 122 can be tailored to accommodate various cross-sectional areas. In addition, the core of the unidirectional tows 122 can be of uniform cross-section or can be tailored to provide varying cross-sectional areas along the length.

The three-piece core construction of the wind tunnel blade 30 provides structural, longitudinal support along the length of the wind tunnel blade. Adjacent foam core sections provide I-beams at their intersections.

The balance mechanism 82 provides an easy manner in which to match the centers of gravity and weight of a large number of wind tunnel blades 30. The balance mechanism 82 is easily adjustable, and is easily accessed by removal of the wind tunnel blade 30.

The stepped braided fibers on the central foam core section 70 provide increased strength adjacent to the base 32, and lighter weight near the tip 38 of the wind tunnel blade 30. The stepped construction therefore provides the optimal strength and weight characteristics for the wind tunnel blade 30.

The methods of construction of the wind tunnel blade 30 disclosed herein are not only convenient for formation of the wind tunnel blade 30, but can also be used for additional parts. For example, the expandable plug 87 provides an easy manner of plugging a tube within a preform. The expandable plug 87 prevents the flow of resin into the metal tube 80 during the resin transfer molding process, but after being cut, releases the sides of the metal tube 80 and falls out of the metal tube.

The tackifier 112 provides a convenient way of stabilizing the edges of reinforced preforms prior to trimming the edges. A tackifier 112 is applied to edges to be cut, and is locally consolidated so that the fiber preforms are held together during the cutting process. In this way, the fraying, lofting, and distortion caused by trimming can be avoided.

The method for providing multiple ply drop off of braided fabric disclosed herein provides a convenient and efficient manner of providing a reinforced core structure for a composite part. Grooves are provided on the core, and the braided fibers are tied off in the grooves. The tied off, braided fibers provide a smooth transition on reverse of direction of the braiding of the fibers, and permits an additional fiber layer to be braided over the transition.

While the preferred embodiment of the invention has been illustrated and described with reference to preferred embodiments thereof, it will be appreciated that various changes can be made therein without departing from the spirit and scope of the invention as defined in the appended claims.

The embodiments of the invention in which an exclusive property or privilege is claimed are defined as follows:

1. A method of forming a reinforced core structure for use in a resin transfer molding process comprising:
   (a) providing an expanded core having a longitudinal axis;
   (b) braiding a first set of fibers from a first end of the expanded core to a first location on the expanded core;
   (c) reversing the direction of the braiding of the first set of fibers at the first location and continuing braiding back to the first end so that the first set of braided fibers is braided back upon itself to form a first dual layer fiber structure;

(d) braiding a second set of fibers over the first set of braided fibers from the first end beyond the first location to a second location; and (e) reversing the braiding direction of the second set of fibers at the second location back toward the first end so that the second set of braided fibers is braided back upon itself to form a second dual layer fiber structure.

2. The method of claim 1, further comprising the step of tying the first set of braided fibers at the first location with a cord before reversing direction of the braided fibers.

3. The method of claim 2, further comprising the step of tying the second set of braided fibers at the second location with a cord before reversing direction of the braided fibers.

4. The method of claim 1, wherein the expanded core comprises a plurality of grooves extending transverse to the longitudinal axis.

5. The method of claim 4, wherein a first groove is located at the first location, and further comprising:

tying the first set of braided fibers with a cord before reversing direction of the first set of braided fibers, the cord being arranged opposite the first groove such as to pull the first set of braided fibers into the first groove.

6. The method of claim 5, wherein a second groove is located at the second location, and further comprising:

tying the second set of braided fibers with a cord before reversing direction of the second set of braided fibers, the cord being arranged opposite the groove such as to pull the second set of braided fibers into the second groove.

7. The method of claim 6, wherein the perimeter of the expanded core between the first and second grooves is substantially the same as the perimeter of the expanded core in the region between the first groove and the end and the overlapped layers of the first set of braided fibers extending over this latter area.

8. The method of claim 7, further comprising:

braiding a third set of fibers from the first end over the first and second sets of braided fibers to beyond the second groove to a third groove; and reversing the braiding direction of the third set of fibers at the third groove back toward the first end so that the third set of braided fibers is braided back upon itself to form a third dual layer fiber structure.

9. The method of claim 8 further comprising:

tying the third set of braided fibers with a cord before reversing direction of the third set of braided fibers, the cord being arranged opposite the groove such as to pull the third set of braided fibers into the third groove.

10. The method of claim 8, wherein the perimeter of the expanded core between the first and second grooves and the overlapped layers of the second set of braided fibers extending thereover is substantially the same as the perimeter of the expanded core in the region between the second and third grooves.

11. The method of claim 1, further comprising:

braiding a third set of fibers from the first end over the first and second sets of braided fibers to beyond the second location to a third location; and reversing the braiding direction of the third set of fibers at the third location back toward the first end so that the third set of braided fibers is braided back upon itself to form a third dual layer fiber structure.

* * * * *